(12) United States Patent
Kim

(10) Patent No.: US 10,599,046 B2
(45) Date of Patent: Mar. 24, 2020

(54) METHOD, A NON-TRANSITORY COMPUTER-READABLE MEDIUM, AND/OR AN APPARATUS FOR DETERMINING WHETHER TO ORDER A MASK STRUCTURE

(71) Applicant: Samsung Electronics Co., Ltd., Suwon-si, Gyeonggi-do (KR)

(72) Inventor: Seongjong Kim, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 9 days.

(21) Appl. No.: 15/987,238

(22) Filed: May 23, 2018

(65) Prior Publication Data

US 2018/0348641 A1 Dec. 6, 2018

Related U.S. Application Data

(60) Provisional application No. 62/514,082, filed on Jun. 2, 2017.

(51) Int. Cl.
*G06F 17/50* (2006.01)
*G03F 7/20* (2006.01)
*G03F 1/22* (2012.01)

(52) U.S. Cl.
CPC .............. *G03F 7/705* (2013.01); *G03F 1/22* (2013.01); *G03F 7/70283* (2013.01);
(Continued)

(58) Field of Classification Search
USPC ........................................................ 716/52
See application file for complete search history.

(56) References Cited

U.S. PATENT DOCUMENTS 8,245,160 B2 8/2012 Ye et al.
8,732,625 B2 5/2014 Ye et al.
(Continued)

FOREIGN PATENT DOCUMENTS

JP 2013195175 A 9/2013
WO WO-2015158444 A1 10/2015
(Continued)

OTHER PUBLICATIONS

Paul Werbaneth, What Is Computational Lithography and How Does It Keep Moore's Law Alive?, SEMI, Apr. 9, 2013, <http://www.semi.org/en/node/45241>.
(Continued)

*Primary Examiner* — Bryce M Aisaka
(74) *Attorney, Agent, or Firm* — Harness, Dickey & Pierce, P.L.C.

(57) ABSTRACT

A method for determining whether to order a mask structure using a processor may include acquiring a simulation result of an EUV pattern layout, determining a correlation parameter (CP), generating a predicted wafer process window, and determining the mask structure is suitable for ordering based on the CP and the predicted wafer process window. The processor may determine the CP based on a weighting value and a simulated depth of focus (DOF), a simulated energy latitude (EL), and simulated line-LER area and LER-width parameters in the simulation result. The CP may indicate a correlation between the simulation result of the EUV pattern layout and an actual wafer result of the EUV pattern layout. The predicted wafer process window may be generated using the processor based on the CP. The predicted wafer process window may indicate whether the actual wafer result of the EUV pattern layout will include a patterning defect.

20 Claims, 14 Drawing Sheets

(52) U.S. Cl.
CPC ...... *G03F 7/70508* (2013.01); *G03F 7/70625* (2013.01); *G03F 7/70641* (2013.01); *G06F 17/504* (2013.01); *G06F 17/5009* (2013.01); *G06F 2217/16* (2013.01)

(56) References Cited

U.S. PATENT DOCUMENTS

| | | |
|---|---|---|
| 8,806,394 B2 | 8/2014 | Feng et al. |
| 8,812,145 B2 | 8/2014 | Fan et al. |
| 9,213,783 B2 | 12/2015 | Hansen |
| 9,390,206 B2 | 7/2016 | Ye et al. |
| 9,494,874 B2 | 11/2016 | Chen et al. |
| 9,612,541 B2 | 4/2017 | Shi et al. |
| 2006/0234137 A1 | 10/2006 | Kim |
| 2010/0180251 A1 | 7/2010 | Ye et al. |
| 2010/0315614 A1 | 12/2010 | Hansen |
| 2012/0229786 A1 | 9/2012 | Engelen et al. |
| 2015/0016709 A1 | 1/2015 | Toyoda et al. |
| 2015/0227654 A1 | 8/2015 | Hunsche et al. |
| 2016/0162626 A1 | 6/2016 | Herrmann et al. |
| 2016/0189368 A1 | 6/2016 | Shindo |
| 2016/0231654 A1 | 8/2016 | Hsu et al. |
| 2016/0313651 A1 | 10/2016 | Middlebrooks et al. |
| 2017/0010538 A1 | 1/2017 | Hansen |
| 2017/0038692 A1 | 2/2017 | Hsu et al. |
| 2017/0052455 A1 | 2/2017 | Tseng |
| 2017/0082927 A1 | 3/2017 | Hsu et al. |
| 2017/0336712 A1* | 11/2017 | Finders ................ G03F 7/705 |

FOREIGN PATENT DOCUMENTS

| | | |
|---|---|---|
| WO | WO-2015197313 A1 | 12/2015 |
| WO | WO-2016128392 A1 | 8/2016 |

OTHER PUBLICATIONS

Chenxi Lin et al., Feasibility study of grapho-epitaxy DSA for complementing EUV lithography beyond N10, ASML, Oct. 2015, <http://www.dsasymposium.org/images/proceedings/O10_Lin.pdf>.

Yan Borodovsky, EUV Lithography at Insertion and Beyond, Intel, 2012 Int'l Workshop on EUV Lithography, <https://www.euvlitho.com/2012/P1.pdf>.

Dylan McGrath, What is source-mask optimization?, EE Times, Feb. 27, 2009, http://www.eetimes.com/document.asp?doc_id=1170467&print=yes.

* cited by examiner

METHOD, A NON-TRANSITORY COMPUTER-READABLE MEDIUM, AND/OR AN APPARATUS FOR DETERMINING WHETHER TO ORDER A MASK STRUCTURE

CROSS-REFERENCE TO RELATED APPLICATION

This application claims priority under 35 U.S.C. § 119(e) to U.S. Provisional Patent Application No. 62/514,082, filed on Jun. 2, 2017, the entire contents of which are herein incorporated by reference.

BACKGROUND

1. Technical Field

The present disclosure relates to a method and/or apparatus for determining whether to order a mask structure for a patterning process and/or more particularly a method for determining whether to order a mask structure for an Extreme Ultraviolet (EUV) patterning process.

2. Description of Related Art

The semiconductor industry is studying EUV patterning as a next-generation photolithography technology. Photoresist development is underway to support EUV patterning. As part of developing an EUV patterning process, computational techniques may be used to simulate the EUV patterning process. If the simulation of the EUV patterning process satisfies simulation success criteria, then a mask structure may be ordered based on the EUV patterning simulation. Then, the EUV patterning process may be tested by forming an actual resist pattern.

On the other hand, if the results for the actual resist pattern do not correlate well with the EUV patterning simulation, then the simulation of the EUV patterning process may be changed. After changing the simulation of the EUV pattern process, a different mask may be ordered based on the changed EUV patterning simulation. Then, the different mask may be tested to form another resist pattern.

Line Edge Roughness (LER) may be a factor used to determine a resist process window in an EUV process. A concept named Stochastic Edge Placement Error (SEPE) has been introduced; however, SEPE cannot predict a process window acceptably for forming an actual resist pattern on a wafer.

SUMMARY

Some example embodiments relate to an improved method for predicting an EUV patterning margin from a simulation result using a processor.

Some example embodiments relate to a method for determining whether to order a mask structure using a processor.

According to some example embodiments, a method for determining whether to order a mask structure using a processor is provided. The method may include acquiring a simulation result of an EUV pattern layout, determining a correlation parameter (CP) using the processor, generating a predicted wafer process window using the processor based on the CP, and determining the mask structure is suitable for ordering based on the CP and the predicted wafer process window. The simulation result may include a simulated depth of focus (DOF), a simulated energy latitude (EL), a simulated line-edge roughness (LER) area parameter that is less than or equal to a first threshold, and a simulated LER width parameter that is less than or equal to a second threshold. The simulated LER area parameter may indicate a roughness of one or more area features in the simulation result of the EUV pattern layout. The simulated LER width parameter may indicate a roughness of one or more line features in the simulation result of the EUV pattern layout. The CP may be determined using the processor based on the simulated DOF, the simulated EL, the simulated LER area parameter, the simulated LER width parameter, and a weighting value for the simulation result. The CP may indicate a correlation between the simulation result of the EUV pattern layout and an actual wafer result of the EUV pattern layout. The predicted wafer process window may be generated using the processor based on the CP. The predicted wafer process window may indicate whether the actual wafer result of the EUV pattern layout will include a patterning defect.

Some example embodiments relate to a non-transitory computer-readable medium storing instructions, that when executed by a processor, causes the processor to control an electronic device for performing one or more of the above-described methods.

According to some example embodiments, a non-transitory computer-readable medium may store computer-executable instructions that, when executed by a processor, cause the processor to perform operations for determining whether to order a mask structure using an electronic apparatus. The operations may include acquiring a simulation result of an EUV pattern layout using the electronic apparatus, determining a correlation parameter (CP) using the electronic apparatus, generating a predicted wafer process window using the electronic apparatus based on the CP, and determining the mask structure is suitable for ordering based on the CP and predicted wafer process window. The simulation result may include a simulated depth of focus (DOF), a simulated energy latitude (EL), a simulated line-edge roughness (LER) area parameter that is less than or equal to a first threshold, and a simulated LER width parameter that is less than or equal to a second threshold. The CP may be determined based on the simulated DOF, the simulated EL, the simulated LER area parameter, the simulated LER width parameter, and a weighting value for the simulation result. The CP may indicate a correlation between the simulation result of the EUV pattern layout and an actual wafer result of the EUV pattern layout. The predicted wafer process window may indicate whether the actual wafer result of the EUV pattern layout will include a patterning defect.

According to some example embodiments, an apparatus for determining whether to order a mask structure is provided. The apparatus may include a processor coupled to a memory. The processor, in response to executing instructions received from the memory, may be configured to determine a correlation parameter (CP), based on a simulated depth of focus (DOF), a simulated energy latitude (EL), a simulated line-edge roughness (LER) area parameter, a simulated LER width parameter, and a weighting value. The simulated DOF, the simulated EL, the simulated LER area parameter, the simulated LER width parameter may be based on a simulation result of an EUV patterning layout. The CP may indicate a correlation between the simulation result of the EUV pattern layout and an actual wafer result of the EUV pattern layout. The processor may be configured to generate a predicted wafer process window based on the CP. The predicted wafer process window may indicate whether the actual wafer result of the EUV pattern layout will include a patterning defect. The processor may be configured to determine whether the mask structure is suitable for ordering based on the CP and the predicted wafer process window.

Features and effects are not limited to those set forth above and other features and effects than those set forth above will be clearly understood to a person skilled in the art from the following description.

BRIEF DESCRIPTION OF THE DRAWINGS

The above and other objects, features and effects of inventive concepts will become more apparent to those of ordinary skill in the art by describing in detail example embodiments thereof with reference to the accompanying drawings.

DETAILED DESCRIPTION

Unless otherwise defined, all terms (including technical and scientific terms) used in this specification can be used as meanings capable of being commonly understood by those having ordinary skill in the technical field to which example embodiments belong. Also, commonly used and predefined terms are not interpreted ideally or unduly, unless specifically defined otherwise.

As part of developing an EUV patterning process, computational techniques may be used to generate a simulation result of an EUV pattern layout. The simulation result of the EUV pattern layout may include a simulated process window. For example, the simulation result of the EUV pattern may include a simulated depth of focus (DOF), a simulated energy latitude (EL), a simulated line-edge roughness (LER) area parameter, and a simulated LER width parameter. The energy latitude EL may be referred to as an exposure latitude. The simulated DOF may refer to a range of focus permitted during the EUV patterning process to form the patterned feature within desired specifications (e.g., CD of feature within target range, EL, etc.). The simulated EL may be a parameter that indicates a change in the CD of a patterned feature for a given change on the simulated dose of the simulated EUV process. The simulated LER area parameter may indicate a roughness of one or more area features in the simulation result of the EUV pattern layout. The simulated LER width parameter may indicate a roughness of one or more line features in the simulation result of the EUV pattern layout.

The simulation result of the EUV pattern layout may be considered a suitable simulation result based on desired criteria. The desired criteria for the simulation result of the EUV pattern layout may be determined based on what process window is believed to obtain desired critical dimension (CD) control of a patterned feature during the actual EUV patterning process on a wafer. For example, the desired criteria may include a desired simulated DOF, a desired simulated EL, a desired simulated LER area parameter that is less than or equal to a first threshold, and a simulated LER width parameter that is less than or equal to a second threshold; however, example embodiments are not limited thereto.

Figure 1:
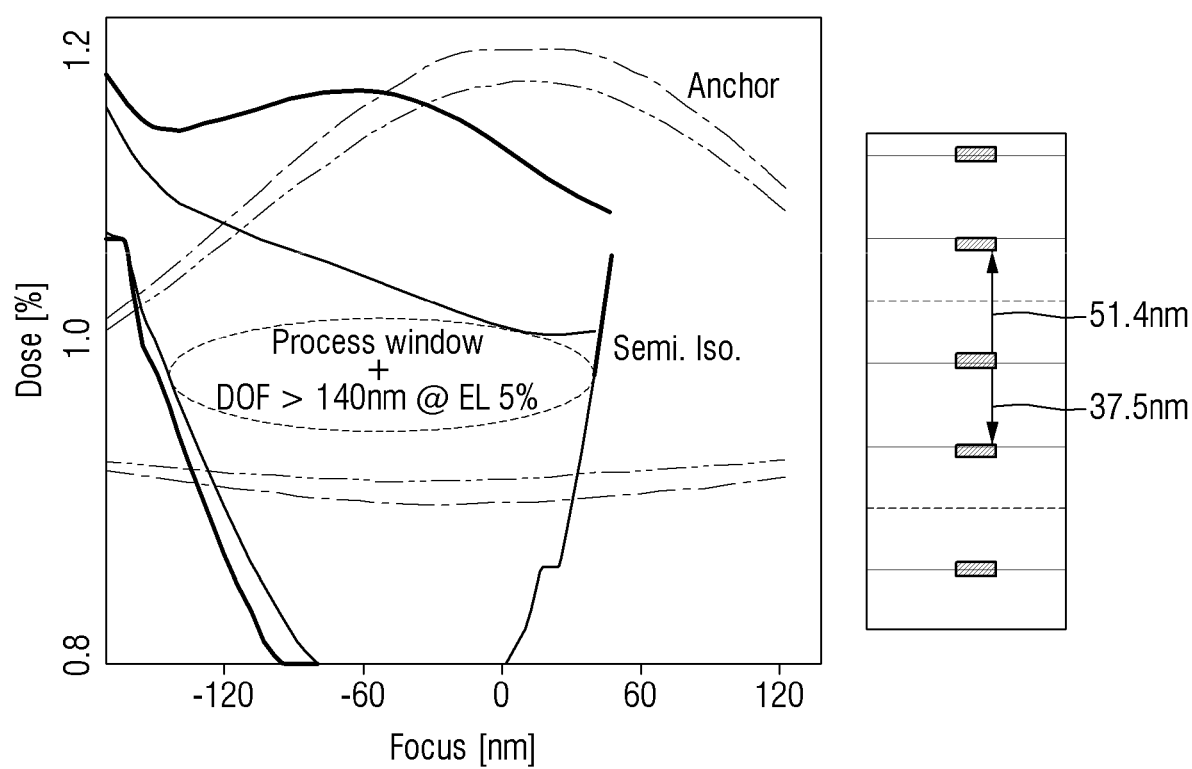
FIG. 1 is an example diagram of information from a simulation result of an EUV pattern layout.

FIG. 1 is an example diagram of information from a simulation result of an EUV pattern layout.

Referring to FIG. 1, the example diagram of information may include a simulated process window of dose [%] and focus [nm] conditions for an EUV patterning process. The simulated process window may include process window information for an anchor pattern and a semi-isolated pattern.

In FIG. 1, the simulated process window may be generated using various computational lithography software used in the art, such as the Tachyon NXE software package from Brion Technologies, and using an EUV layout provided to a computer configured to execute the computational lithography software. The simulated LER parameter may be a stochastic edge placement error (SEPE) band space that is less than or equal than the first threshold. The simulated LER width parameter may be a SEPE band width that is less than or equal to the second threshold. For example, in FIG. 1 the SEPE band space and SEPE band width may be 51.4 nm and 37.5 nm, which may be less than or equal to the first threshold and the second threshold set based on desired criteria.

In the example shown in FIG. 1, the simulated process window for the semi-isolated pattern may have a DOF that is greater than 140 nm at a 5 percent EL. For example, the simulated process window may have a DOF of 188 nm with 5 percent EL, and the SEPE band space and width that are suitable based on criteria set for the simulated process window of the simulated EUV pattern layout. The values for the DOF, EL, SEPE band space, SEPE band width, etc. in FIG. 1 are non-limiting examples and a simulated process window for a different EUV layout may have other values for the DOF, EL, SEPE band space, SEPE band width, etc. Also, a simulated process window may include parameters for an isolated pattern instead of, or in addition to, a semi-isolated pattern.

Even though the process window based on the simulation result of the EUV pattern layout may predict a suitable process window, there may be a difference between the simulation result and the actual process window of an EUV patterning process on a wafer that uses a mask developed from the simulation. For example, the wafer result on a wafer of an EUV patterning process using a mask developed from the simulation result may not have a suitable process window.

Figure 2:
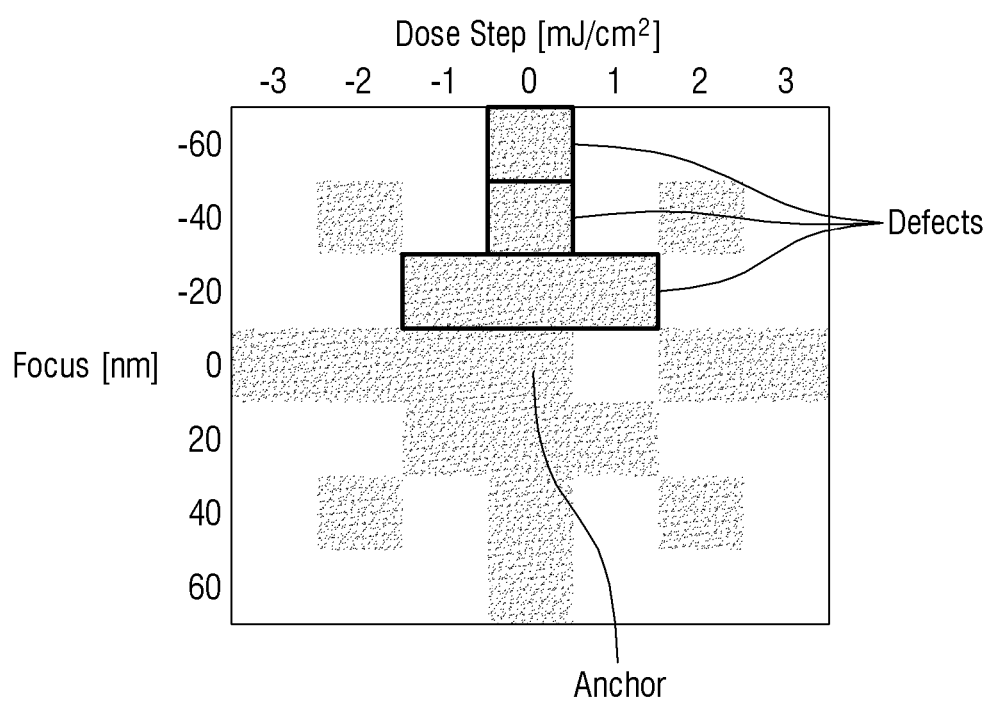
FIG. 2 is a diagram of a process window for a semi-isolated pattern of an actual wafer result for an EUV process.

FIG. 2 is a diagram of a process window for a semi-isolated pattern of an actual wafer result for an EUV process.

Referring to FIG. 2, the diagram in FIG. 2 represents a focus-exposure metric (FEM) margin map of an EUV patterning process that uses a mask developed from the simulation result of the EUV pattern layout discussed in FIG. 1.

In FIG. 2, the best dose and best focus (BDBF) condition may be determined from an anchor pattern to be formed on the wafer. The anchor pattern may be selected from one of the patterns to be formed in the EUV patterning process that includes the most difficult feature to pattern on the wafer. For example, the anchor pattern may be a pattern that has the smallest pitch size compared to all of the patterns to be formed.

In FIG. 2, the FEM result includes results from forming actual resist patterns on the wafer using a mask and an EUV patterning process based on the simulation result of the EUV pattern layout and with varying the focus and dose conditions. A Focus of 0 nm and a Dose of 0 mJ/cm$^2$ may correspond to the BDBF condition. Dose steps of −1/1, −2/2, and −3/3 [mJ/cm$^2$] may refer to dose conditions that differ from the BDBF Dose—plus or minus—by respective amounts of a first interval, twice the first interval, and three times the first interval, respectively. Similarly, in FIG. 2, Focus values of −20 nm/20 nm, −40 nm/40 nm, and −60 nm/60 nm may refer to Focus conditions that vary from the BDBF condition by respective amounts of 20 nm, 40 nm, and 60 nm.

The resist patterns formed on the wafer may be reviewed for defects, such as the LER area exceeding a first threshold (e.g., a first value), the LER width exceeding a second threshold (e.g., a second value), and/other patterning defects (e.g., bridges, the failure of a pattern to form, etc.). Black rectangles on the FEM result identify resist patterns for a given Focus and Dose step that have patterning defects. For example, in FIG. 2, the resist patterns formed at a Focus of −20 nm and Dose steps of −1, 0, and 1 mJ/cm$^2$ have defects. Also, the resist patterns formed at a Dose Step of 0 mJ/cm$^2$ and Focus of −60 nm and −40 nm have defects. In FIG. 2, resist patterns that are not surrounded by black rectangles are resist patterns where patterning defects were not observed. For example, patterning defects were not observed on resist patterns formed with Focus of 0 nm to 60 nm and a Dose step of −3 to 3 mJ/cm$^2$.

The FEM result in FIG. 2 shows the actual wafer result does not correlate with the simulated process window in the simulation result of the EUV pattern layout discussed in FIG. 1. Based on the simulation result of the EUV pattern layout in FIG. 1, patterning defects were not expected for the range of Focus and Dose step conditions used to prepare the FEM result in FIG. 2; however, as shown in FIG. 2, patterning defects were identified for some of the Focus and Dose step conditions shown in FIG. 2.

Because there may be a difference between the simulation result of an EUV pattern layout (see e.g., FIG. 1) and the actual process window of an EUV patterning process on a wafer (see e.g., FIG. 2) that uses a mask developed from the simulation, a mask may be ordered based on the simulation result of the EUV pattern layout; however, the mask may not be suitable for the actual EUV patterning process because the mask may cause an unacceptable level of patterning defects. Thus, time and expense may be wasted by ordering masks that are not suitable for an actual EUV patterning process.

According to some example embodiments, a method for determining whether to order a mask structure using a processor may be performed to limit and/or prevent ordering masks that are not suitable for an actual EUV patterning process. The method for determining whether to order a mask structure may be used to predict whether a mask ordered based on an acceptable simulation result of an EUV pattern layout may be a suitable mask for an actual EUV patterning process on the wafer. The mask may be a suitable mask if the actual EUV patterning process does not cause an unacceptable amount of patterning defects over the process window for the EUV patterning process. According to some example embodiments, the method for determining whether to order the mask structure using the processor may include a method for predicting an EUV patterning margin using the processor.

Figure 9:
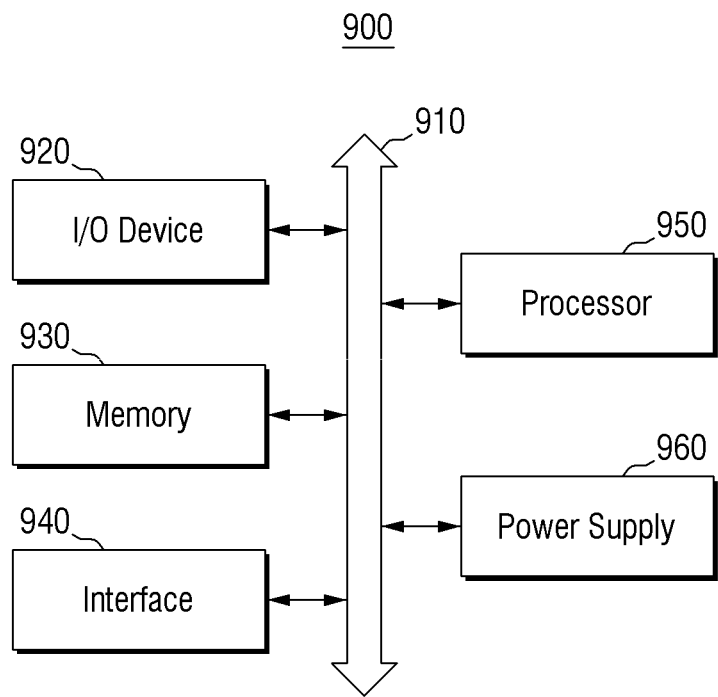
FIG. 9 is an apparatus for determining whether to order an EUV mask structure using a processor according to some example embodiments.

FIG. 9 is an apparatus for determining whether to order an EUV mask structure according to some example embodiments.

Referring to FIG. 9, in some example embodiments, the apparatus 900 may include an input/output device 920 (e.g., keyboard and/or touch screen), a memory 930, an interface 940, a processor 950, and a power supply 960, operably connected to each other through a bus 910. The bus 910 corresponds to a path along which data, instructions, and/or commands move. The power supply 960 may power overall operations of the apparatus 900.

The processor 950 may include hardware such as at least one of a microprocessor, a microcontroller, and/or logic devices capable of performing similar functions. The input/output device 920 may include hardware such as a keypad, a keyboard, a display, and so on. The memory 930 may be a non-transitory computer-readable storage medium (e.g., non-volatile memory such as Flash memory or a volatile memory such as DRAM). The memory 930 may be configured to store data and/or commands. The interface 940 may transmit data to a communication network or receive data from the communication network. The interface 940 may be wired or wireless. For example, the interface 940 may include an antenna or a wired/wireless transceiver. The interface 940 may include a port for receiving data stored on a memory stick.

The memory 930 may store instructions, that when executed by the processor 950, cause the processor 950 to perform one or more of operations of various methods and/or control the apparatus 900 to perform one or more operations of various methods, examples of which are described with reference to FIGS. 3, 4A, 4B, 4C, 5, 7, 8A and/or 8B.

Figure 3:
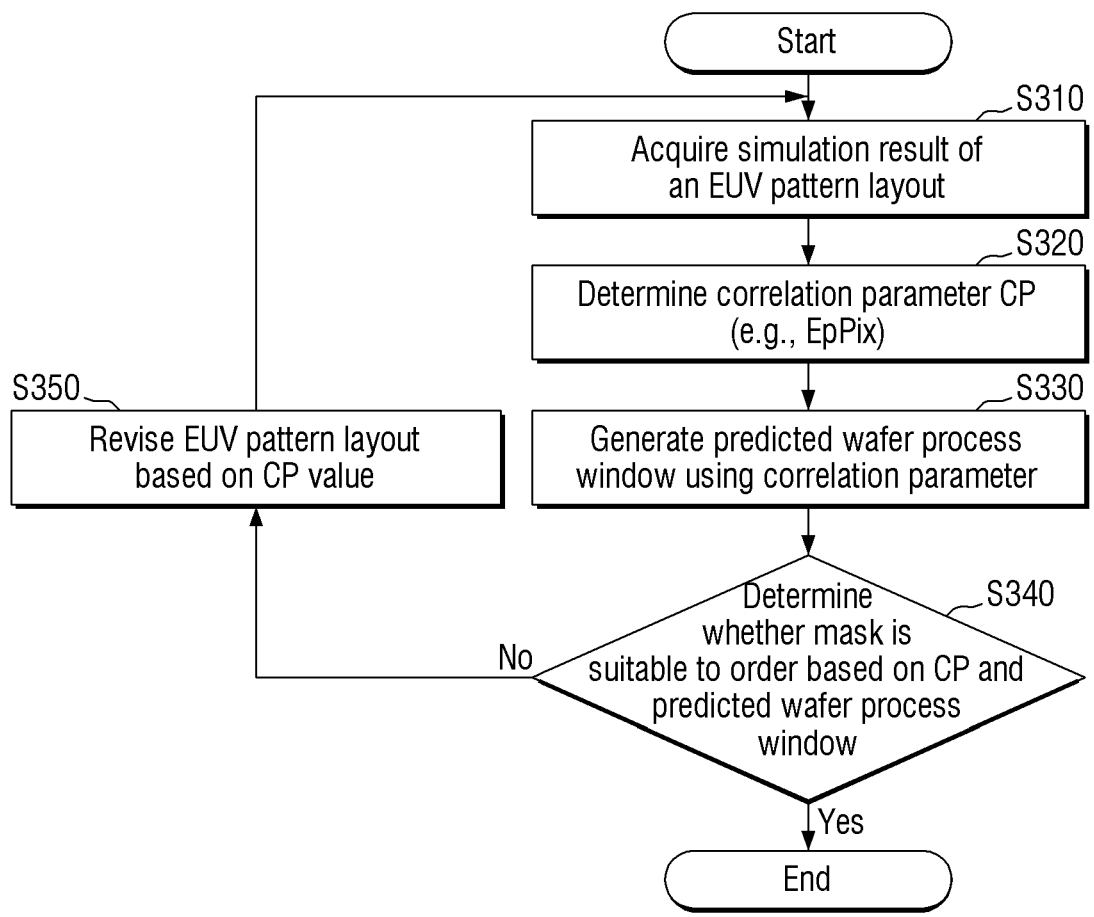
FIG. 3 is a flow chart for a method for determining whether to order a mask structure according to some example embodiments.

FIG. 3 is a flow chart for a method for determining whether to order a mask structure using a processor according to some example embodiments, such as the processor 950 in FIG. 9.

Referring to FIGS. 3 and 9, in operation S310, the processor 950 may acquire a simulation result of an EUV pattern layout. The simulation result may be based on a pre-optical-proximity-correction layout (pre-OPC) and/or calibrated models of an EUV pattern layout. The processor 950 may acquire the simulation result of the EUV pattern layout from the memory 930. The memory 930 may receive the simulation result in response to the simulation result being loaded into the memory 930 through the input/output device 920 and/or interface 940. Alternatively, the processor 950 may generate the simulation result of the EUV pattern layout based on an EUV pattern layout received from the memory 930 and in response to executing instructions received from the memory 930 for performing operations to generate the simulation result.

The simulation result of the EUV pattern layout may include a simulated DOF, a simulated EL, a simulated LER area parameter, and a simulated LER width parameter. The simulation result of the EUV pattern layout may be considered a suitable simulation result based on meeting desired criteria (e.g., a desired simulated LER area parameter that is less than or equal to a first threshold, and a simulated LER width parameter that is less than or equal to a second threshold, etc.). Also, the simulated LER area parameter may be a stochastic edge placement error (SEPE) band space that is less than or equal than the first threshold, and the simulated LER width parameter may be a SEPE band width that is less than or equal to the second threshold. The processor 950 may generate a simulation result of the EUV pattern layout that includes a simulated DOF, a simulated EL, a simulated LER area parameter (e.g., SEPE band space), and simulated LER width parameter (e.g., SEPE band width) according to methods known in the art.

In operation S320, the processor 950 may determine a correlation parameter (CP) based on the simulated DOF, the simulated EL, the simulated LER area parameter, the simulated LER width parameter, and a weighting value w for the simulation result. The weighting value w may be determined based on an empirical study and may be modified on a case-by-case basis. The weighting value w may include one or more components. The initial weighting value w may be extracted by a line and space pattern (or other pattern) in the simulation result of the EUV pattern layout. The correlation parameter CP may indicate a correlation between the simulation result of the EUV pattern layout and an actual wafer result of the EUV pattern layout. A non-limiting example where the correlation parameter CP may be an EUV Patterning Prediction Index (EpPix) value is provided below, but example embodiments are not limited thereto.

In operation S330, the processor 950 may generate a predicted wafer process window based on the correlation parameter CP. The predicted wafer process window may indicate whether an actual wafer result of the EUV pattern layout will include a patterning defect. The actual wafer result may include a resist pattern formed on a wafer using a reticle in an EUV patterning process, and the reticle may be ordered based on the correlation parameter CP and the predicted wafer process window.

In operation S340, the processor 950 may determine whether the mask structure is suitable for ordering based on the CP and the predicted wafer process window. For example, the processor 950 may compare a value of the correlation parameter CP to a first value V1 and a second value V2, and optionally one or more different values V3 to Vn, where n may be an integer, V2 may be greater than V1, V3 may be greater than V2, and so on (e.g., Vn may be greater than Vn−1). In response to a value of the correlation parameter CP that is greater than V1 and less than or equal to V2, the processor 950 may determine the mask structure is suitable to order. In other words, in response to a CP value greater than V1 and less than or equal to V2, the processor 950 may predict that the simulation result of the EUV pattern layout acquired in operation S310 will correlate to a good wafer result such as the pattern will be good within all of the wafer process window or out of focus range. In such as a case, V1<CP<=V2, the processor 950 may decide to order a mask structure.

On the other hand, in response to a CP value in operation S340 that is greater than V2, the processor 950 may decide not to order a mask structure and instead proceed to operation S350. In operation S350, the processor 950 may revise the EUV pattern layout (e.g., adjust a target CD in a location where a patterning defect is predicted on the wafer) in response to the correlation parameter CP value being greater than a desired value (e.g., V2). Next, the processor 950 may proceed to operation S310 where the processor may acquire a revised simulation result based on the revised EUV pattern layout. Then, the processor 950 may repeat operations S320, S330, and S340: the processor 950 in operation S320 may determine a revised correlation parameter CP based on the simulated EL, LER area and width parameters, and weighting values of the revised simulation result of the revised EUV pattern layout; the processor in operation S330 may generate a revised predicted wafer process window using the revised correlation parameter CP; and the processor 950 in operation S340 may determine whether the mask is suitable for ordering based on the revised CP and the revised predicted wafer process window. In operation S340, the processor 950 may compare the revised CP first value to the first value V1 and the second V2 and optionally one or more different values V3 to Vn. In response to the revised CP being greater than V2, the processor 950 may proceed to operation S350 again. In response to the revised CP being greater than V1 and less than or equal to V2, then the processor may determine the mask is suitable to order.

The revised correlation parameter CP may indicate a correlation between the revised simulation result of the revised EUV pattern layout and an actual wafer result of the revised EUV pattern layout. The revised predicted wafer process window may indicate whether the actual wafer result of the revised EUV pattern layout will include one or more patterning defects.

In some example embodiments, in operation S320, the correlation parameter CP may be an EUV Patterning Prediction Index (EpPix). Also, the revised correlation parameter CP in operation S320 may be a revised EpPix based on a simulation of the revised EUV pattern layout following operations S350 and S310. In other words, the processor 950 may determine the EpPix as the correlation parameter CP and/or the processor 950 may determine revised EpPix as the revised correlation parameter CP. The processor 950 may determine an EpPix (or revised EpPix) according to the formula in equation (1) below.

$$\text{EpPix} = \{(1 + w_i^a + w_{ii}^b) - (e, f)\} \times (1 + w_{iii}^c + w_{iv}^d) \quad (1)$$

a = Focus center of simulated DOF
b = Dose center of simulated EL
c = SEPE band space
d = SEPE band width
e, f = compensation factor
$w_i$, $w_{ii}$, $w_{iii}$, $w_{iv}$ = weighting value(s)

In Equation (1), a and b may be a center of the DOF and a center of the EL from the process window in the simulation result of the EUV pattern layout; c and d may be the SEPE band space and band width; e,f may be an exposure-focus compensation factor; and $w_i$ to $w_{iv}$ may be components of a weighting value. The values for $w_i$ to $w_{iv}$ may be determined based on a model from an empirical study and may be modified on a case-by-case basis. The initial values for $w_i$ to $w_{iv}$ may be extracted by a line and space pattern (or other pattern) in the simulation result of the EUV pattern layout. The initial value for $w_i$ to $w_{iv}$ may be modified based on empirical results for whether the process window in the simulation result of the EUV pattern layout correlates with the wafer result of resist formed on a wafer using a mask based on the simulation for an EUV patterning process. The values for $w_i$ to $w_{iv}$ may be in a range of about 1 to about 10, but example embodiments are not limited thereto. A value for one of $w_i$ to $w_{i_v}$ may be the same as or different than a value of another other one of $w_i$ to $w_{i_v}$.

The exposure-focus compensation factor (e,f) may be determined based on a model from an empirical study and may be modified on a case-by-case basis. The exposure-focus compensation factor (e,f) may be in a range of about 1 to about 10 and/or about 1 to about 5 and/or about 1 to about 3, but example embodiments are not limited thereto.

In some example embodiments, the processor 950 in operation S330 may generate a predicted process window as a Bossung curve. In other example embodiments, the processor 950, in operation S330, may generate a predicted process window as a prediction of a focus exposure metric (FEM) based on the EpPix value. An example of the latter is described below with reference to FIGS. 3 and 4.

An example procedure for determining the exposure-focus compensation factor (e,f) of Equation 1 is described below with reference to FIGS. 4A and 4B.

Figure 4A:
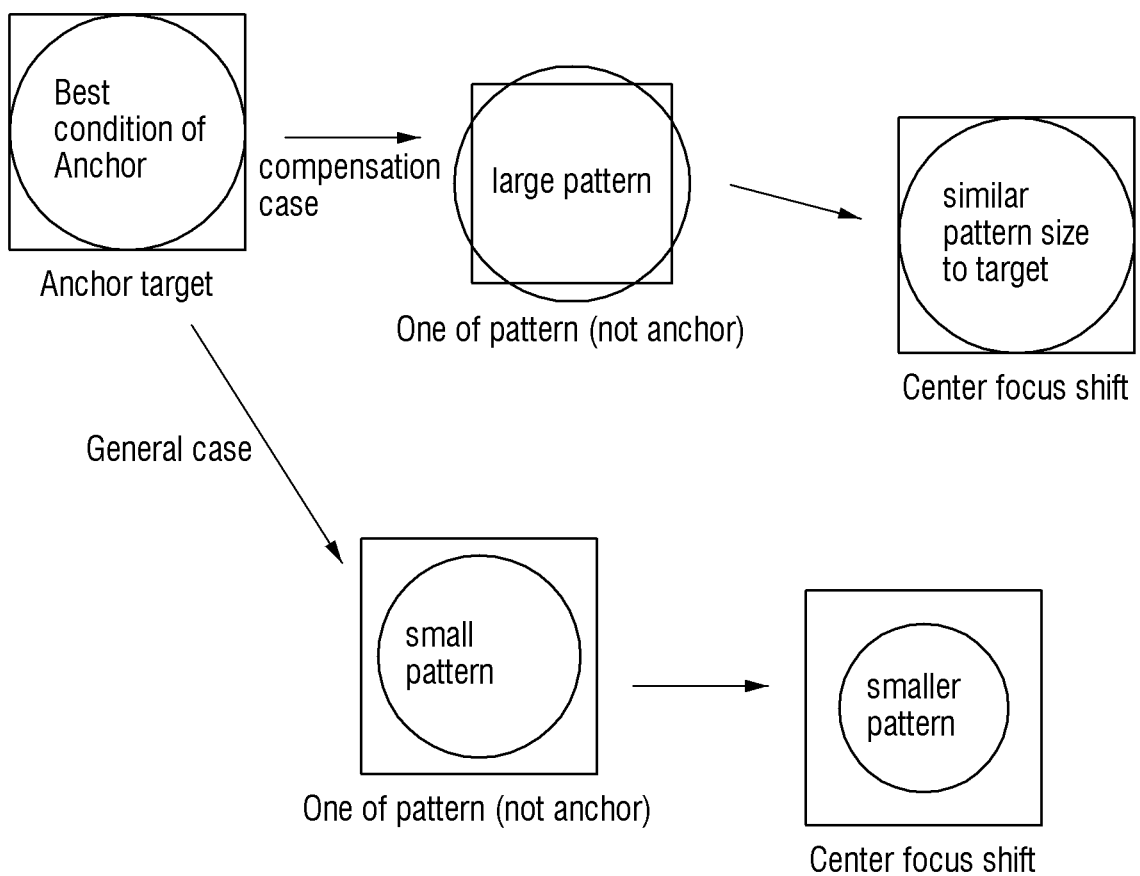
FIGS. 4A to 4C are diagrams for determining a compensation factor and a weighting value according to some example embodiments.

Referring to FIG. 4A, as discussed above with reference to FIG. 2, the best dose and the best focus (BDBF) condition of the anchor pattern may be determined. The processor 950 may use a constant (e.g., 0) for the exposure-focus compensation factor (e,f) in Equation 1 when the processor 950 calculates the EpPix value for the anchor pattern because the anchor pattern may be formed using the anchor BDBF condition for the EUV patterning process.

Then, a selected non-anchor pattern in the EUV layout may be evaluated based on the EUV patterning process using the anchor BDBF condition. The processor 950 may receive information that indicates a prediction of a pattern size of the selected non-anchor pattern formed from EUV pattern process using the BDBF conditions. Then, the processor 950 may compare the predicted pattern size of the selected non-anchor pattern to the target size of the selected non-anchor pattern. Based on the difference between the predicted pattern size and target size of the selected non-anchor pattern, the processor 950 may determine whether at least one Dose Step and/or at least one Focus Step adjustment to the anchor BDBF condition may be needed to make the pattern size of the selected non-anchor pattern meet its target size.

For example, as shown in FIG. 4A, the compensation case may refer to correcting a size of a non-anchor pattern when the size of the non-anchor pattern is less than or greater than the anchor size. For example, in a compensation case, the processor 950 may determine that the pattern size of the selected non-anchor pattern may be larger than its target size (e.g., Over dose), when formed using the anchor BDBF condition for the EUV patterning process; in which case, the processor 950 may determine a lower dose than the anchor BDBF condition may be needed to make the pattern size of the selected non-anchor pattern meet its target size. For example, in the other compensation case, the processor 950 may determine that the pattern size of the selected non-anchor pattern may be smaller than its target size (e.g., Lack of dose), when formed using the anchor BDBF condition for the EUV patterning process; in which case, the processor 950 may determine a higher dose than the anchor BDBF condition may be needed to make the pattern size of the selected non-anchor pattern meet its target size. Alternatively, the general case may refer to conventional technology. In a general case, the processor 950 may determine that the pattern size of the selected non-anchor pattern may be smaller than its target size (e.g., Lack of dose), when formed using the anchor BDBF condition for the EUV patterning process; in which case, however, the processor 950 may make the pattern size of the selected non-anchor pattern smaller.

In some example embodiments, the processor 950 may determine whether at least one Dose Step and/or at least one Focus Step adjustment to the anchor BDBF condition may be needed based on a linear or a non-linear regression formula that expresses a prediction of how much a pattern size of the selected non-anchor pattern changes in response to different dose and/or focus conditions that deviate from the anchor BDBF condition. In other example embodiments, the processor 950 may receive information through the interface 940 on whether at least one Dose Step and/or at least one Focus Step adjustment to the anchor BDBF condition may be needed to make the pattern size of the selected non-anchor pattern meet its target size.

Based on a relationship between a target size of the selected non-anchor pattern and a prediction of the pattern size of the selected non-anchor pattern formed from the EUV patterning process using the anchor BDBF conditions, the processor 950 may determine a value of the exposure-focus compensation factor (e,f) according to a model from an empirical study that may be stored in the memory 930 and/or accessed through the interface 940. The model may be updated and modified according to a case-by-case basis.

Figure 4B:
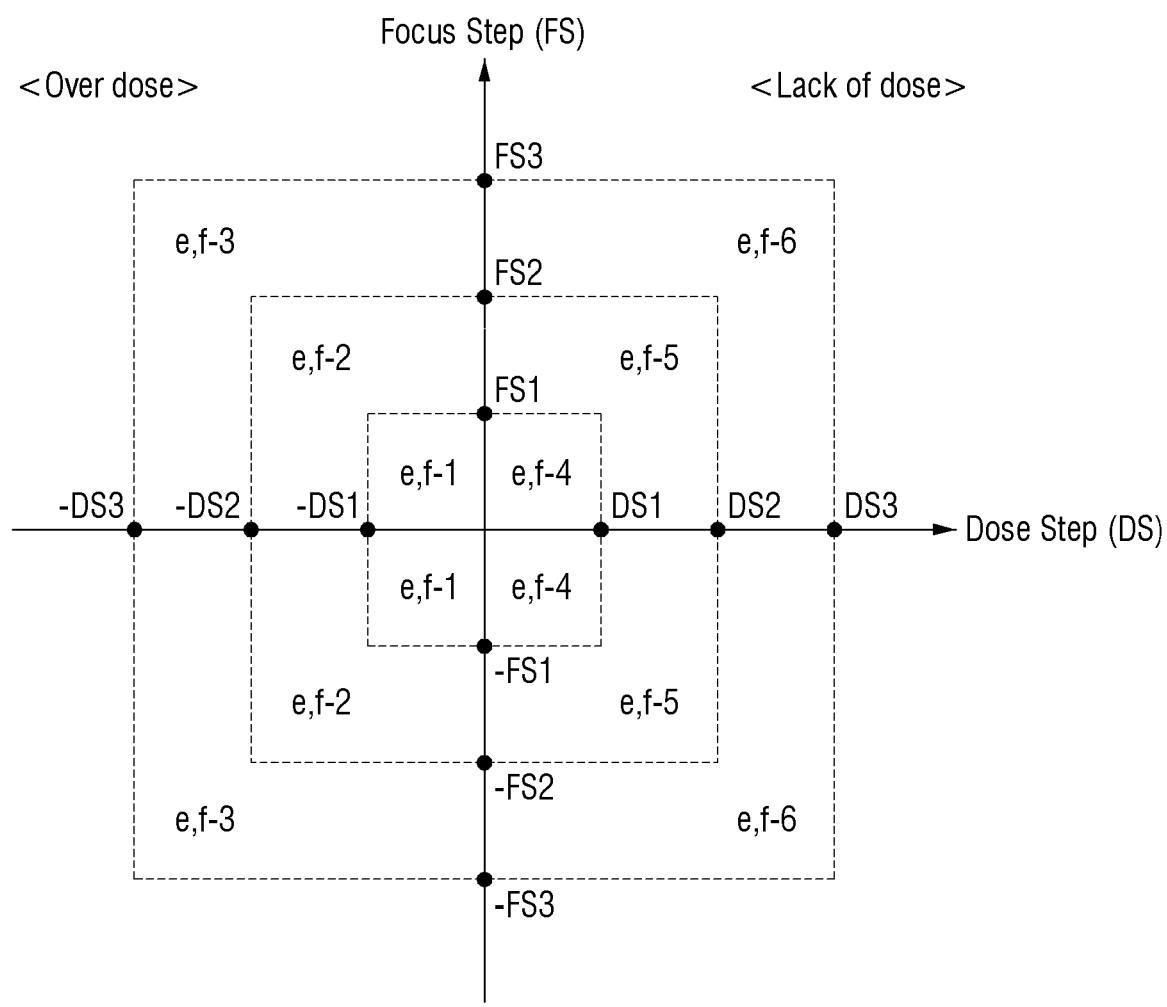

FIG. 4B illustrates an example of different values for the exposure-focus compensation factor (e,f) according to Dose Step (DS) and/or Focus Step (FS) adjustments compared to the anchor BDBF condition.

Referring to FIGS. 4B and 9, the processor 950 may determine e,f-0 as the exposure focus compensation factor (e,f) if the processor 950 determines the pattern size of the selected non-anchor pattern formed from the EUV patterning process using the anchor BDBF condition may meet the target size of the selected non-anchor pattern.

On the other hand, if the processor 950 determines the dose for forming the selected non-anchor pattern should be lowered (e.g., adjusted by −DS1, −DS2, or −DS3, respectively) compared to the anchor BDBF condition to help make the selected non-anchor pattern meet its target size (e.g., Over dose), then the processor 950 may determine a value of the exposure focus compensation factor (e,f) that corresponds to the Dose Step adjustment. For example, as shown in FIG. 4B, e,f-1 corresponds to a Dose Step adjustment in a range of 0 to −DS1 and/or a focus in a range from −FS1 to FS1 from the anchor BDBF condition; e,f-2 corresponds to a Dose Step adjustment in a range from −DS1 to −DS2 and/or a focus in a range from FS1 to FS2 (and/or from −FS1 to −FS2) from the anchor BDBF condition; and e,f-3 corresponds to a Dose Step adjustment in a range from −DS2 to −DS3 and/or focus in a range from FS2 to FS3 (and/or from −FS2 to −FS3) from the anchor BDBF condition.

Additionally, if the processor 950 determines the dose for forming the selected non-anchor pattern should be raised (e.g., adjusted by DS1, DS2, or DS3, respectively) compared to the anchor BDBF condition to help make the selected non-anchor pattern meet its target size (e.g., Lack of dose), then the processor 950 may determine a value of the exposure focus compensation factor that corresponds to the Dose Step adjustment. For example, as shown in FIG. 4B, e,f-4 corresponds to a Dose Step adjustment in a range of 0 to DS1 and/or a focus in a range from −FS1 to FS1 from the anchor BDBF condition; e,f-5 corresponds to a Dose Step adjustment in a range from DS1 to DS2 and/or a focus in a range from FS1 to FS2 (and/or from −FS1 to −FS2) from the anchor BDBF condition; and e,f-3 corresponds to a Dose Step adjustment in a range from DS2 to DS3 and/or a focus in a range from FS2 to FS3 (and/or from −FS2 to −FS3) from the anchor BDBF condition.

The values for e,f-0; e,f-1; e,f-2; and e,f-3 may be different from each other. For example, e,f-0 may be 0; e,f-1 may be 1; e,f-2 may be 2; and e−f-3 may be 3. In some example embodiments, the values of one or more of e,f-0; e,f-4; e,f-5; and e,f-6 may be the same. For example, e,f-4 may be 0; e,f-5 may be 0; and e,f-6 may be 0. Alternatively, the values of one or more of e,f-0; e,f-4; e,f-5; and e,f-6 may be different from each other.

An example procedure for determining the weighting value w is described below with reference to FIG. 4C.

Figure 4C:
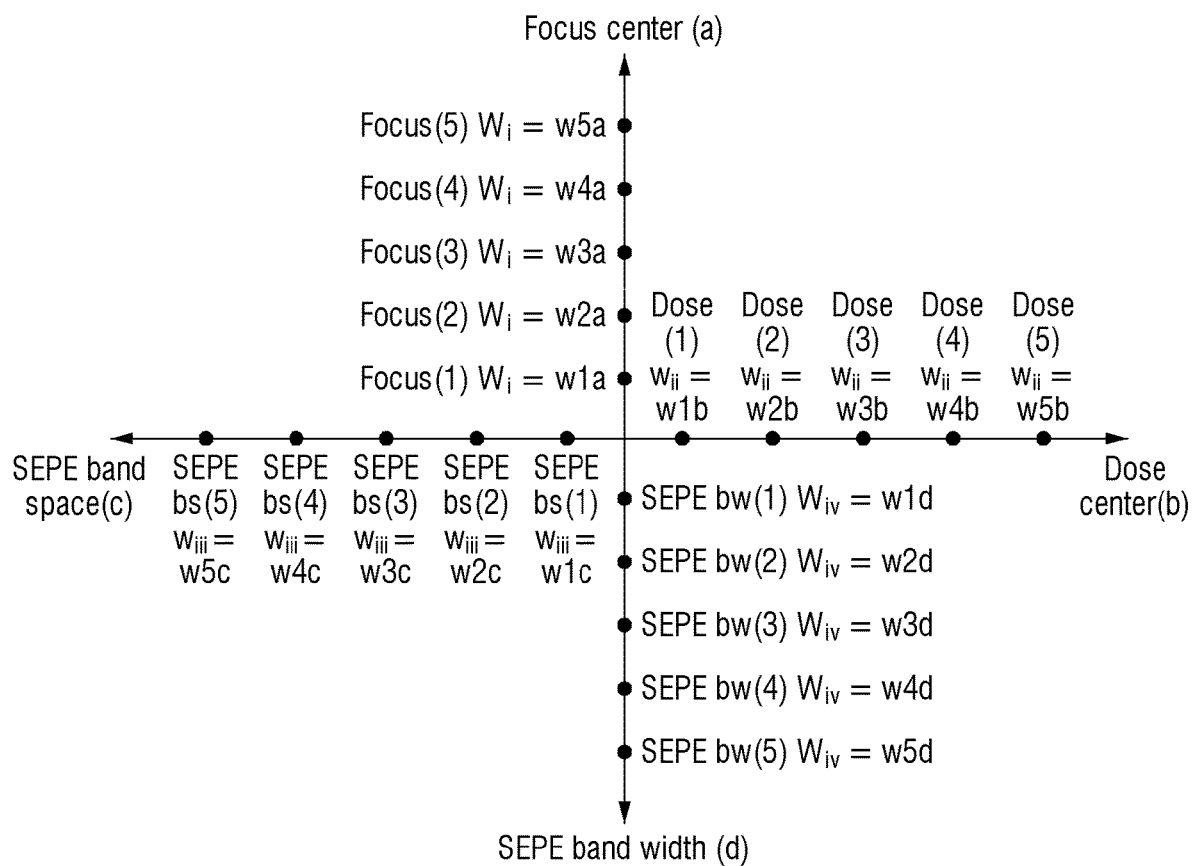

Referring to FIGS. 4C and 9 and Equation (1), the processor 950 may determine the weighting value based on values of the Focus center (a) of the simulated DOF, Dose center (b) of the simulated EL, the SEPE band space (c), and the SEPE band width (d), respectively, based on accessing an empirical model that may be stored in the memory 930 and/or accessed through the interface 940.

In FIG. 4C, w1a to w5a are values for the weighting value $w_i$ that depend on a value of the Focus center (a) of the simulated DOF; w1b to w5b are values for the weighting value $w_{ii}$ that depend on a value of the Dose center (b) of the simulated EL; w1c to w5c are values for the weighting value $w_{iii}$ that depend on a value of the SEPE band space (c); and w1d to w5d are values for the weighting value $w_{iv}$ that depend on a value of the SEPE band width (d). The values w1a to w5a, w1b to w5b, w1c to w5c, and w1d to w5d may modified and updated on a case-by-case basis and/or a type of pattern. The spacing between the respective dots for the Focus center (a), energy latitude (b), SEPE band space (c), and SEPE band width (d) may be determined based on an empirical study updated on a case-by-case basis and/or a type of pattern.

For example, the processor 950 may determine the weighting value $w_i$ equals w1a in response to the Focus center (a) of the simulated DOF being in a range from greater than 0 to less than or equal to Focus (1), the weighting value $w_i$ equals w2a in response to the Focus center (a) of the simulated DOF being in a range from greater than Focus (1) to less than or equal to Focus (2), the weighting value $w_i$ equals w3a in response to the Focus center (a) of the simulated DOF being in a range from greater than Focus (2) to less than or equal to Focus (3), the weighting value $w_i$ equals w4a in response to the Focus center (a) of the simulated DOF being in a range from greater than Focus (3) to less than or equal to Focus (4), and the weighting value $w_i$ equals w5a in response to the Focus center (a) of the simulated DOF being in a range from greater than Focus (4) to less than or equal to Focus (5). The values of w1a to w5a may be different from each other.

For example, the processor 950 may determine the weighting value $w_{ii}$ equals w1b in response to the Dose (b) of the simulated EL being in a range from greater than 0 to less than or equal to Dose (1), the weighting value $w_{ii}$ equals w2b in response to the Dose (b) of the simulated EL being in a range from greater than Dose (1) to less than or equal to Dose (2), the weighting value $w_{ii}$ equals w3b in response to the Dose (b) of the simulated EL being in a range from greater than Dose (2) to less than or equal to Dose (3), the weighting value $w_{ii}$ equals w4b in response to the Dose (b) of the simulated EL being in a range from greater than Dose (3) to less than or equal to Dose (4), and the weighting value $w_{ii}$ equals w5b in response to the Dose (b) of the simulated EL being in a range from greater than Dose (4) to less than or equal to Dose (5). The values of w1b to w5b may be different from each other.

For example, the processor 950 may determine the weighting value $w_{iii}$ equals w1c in response to the SEPE band space (c) being in a range from greater than 0 to less than or equal to SEPE bs(1), the weighting value $w_{iii}$ equals w2c in response to the SEPE bs(b) being in a range from greater than SEPE bs(1) to less than or equal to SEPE bs(2), the weighting value $w_{ii}$ equals w3c in response to the SEPE bs(b) being in a range from greater than SEPE bs(2) to less than or equal to SEPE bs(3), the weighting value $w_{ii}$ equals w4c in response to the SEPE bs(b) being in a range from greater than SEPE bs(3) to less than or equal to SEPE bs(4), and the weighting value $w_{ii}$ equals w5c in response to the SEPE bs(b) being in a range from greater than SEPE bs(4) to less than or equal to SEPE bs(5). The values of w1c to w5c may be different from each other.

For example, the processor 950 may determine the weighting value $w_{iv}$ equals w1d in response to the SEPE band width(d) being in a range from greater than 0 to less than or equal to SEPE bw(1), the weighting value $w_{iv}$ equals w2c in response to the SEPE bw(b) being in a range from greater than SEPE bw(1) to less than or equal to SEPE bw(2), the weighting value $w_{ii}$ equals w3c in response to the SEPE bw(b) being in a range from greater than SEPE bw(2) to less than or equal to SEPE bw(3), the weighting value $w_{ii}$ equals w4c in response to the SEPE bw(b) being in a range from greater than SEPE bw(3) to less than or equal to SEPE bw(4), and the weighting value $w_{ii}$ equals w5c in response to the SEPE bw(b) being in a range from greater than SEPE bw(4) to less than or equal to SEPE bw(5). The values of w1d to w5d may be different from each other.

Figure 5:
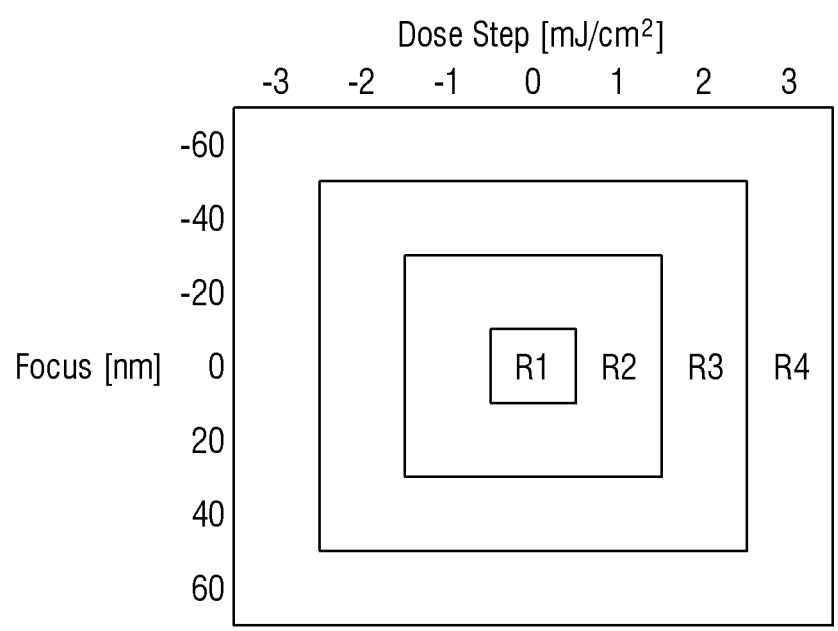
FIG. 5 is a diagram of regions corresponding to a wafer process window.
Figure 6:
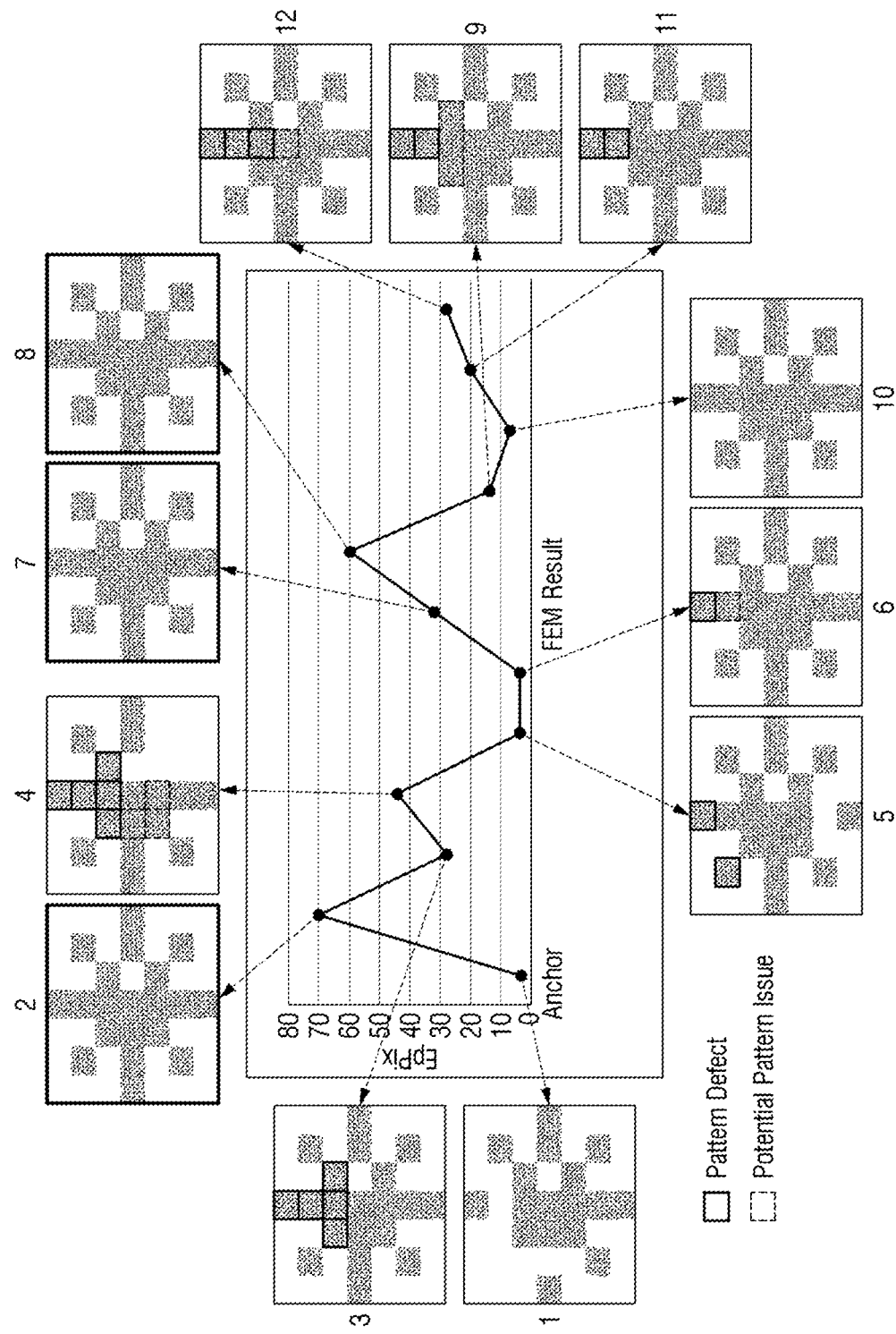
FIG. 6 is a graph showing a relationship between EpPix values and FEM margin results of EUV Patterns formed on a wafer.

FIG. 5 is a diagram of regions corresponding to a wafer process window. FIG. 6 is a graph showing a relationship between EpPix values and FEM margin results of EUV patterns formed on a wafer.

Referring to FIGS. 3 and 5, in some example embodiments, the processor 950, in operation S330, may generate a predicted process window as a prediction of a focus exposure metric (FEM) based on the EpPix value. The processor 950 may predict an EUV patterning margin based on the prediction of the FEM. The processor 950 may generate a prediction of the FEM based on the EpPix value as a FEM margin map, and the FEM margin map may include a plurality of focus regions R1 to Rx (x being an integer) corresponding to different parts of the process window. For example, as shown in FIG. 5, the processor 950 may generate a FEM margin map that may include a first focus region R1, a second focus region R2 surround the first focus region R1, a third focus region R3 that surrounds the second focus region R2, and a fourth focus region R4 that surrounds the third focus region R3. The first to fourth focus regions R1 to R4 may have a same center portion (e.g., a concentric arrangement). Even though FIG. 5 illustrates four focus regions R1 to R4, example embodiments are not limited thereto and the processor 950 may alternatively generate a FEM margin map that has more or fewer than four focus regions R1 to R4.

By determining an EpPix value, the processor 950 may predict how well the process window of the simulation result will correlate with the process window of the corresponding EUV patterning process formed on the wafer. The EpPix value may indicate a process window for each pattern formed on the wafer using a mask developed from the simulation result. Based on the EpPix value, the processor 950 may predict which focus region on the FEM margin map may have an error on a wafer result of the EUV lithography process using a mask based on the simulation result of the EUV pattern layout.

For example, referring to Table 1 below, in response to the processor 950 determining an EpPix as the correlation parameter CP in operation S320, the processor 950 in operations S330 and S340 may predict the wafer process window for an EUV patterning process based on a relationship between the EpPix value and V1 and V2 and optionally V3 and V4. In some example embodiments, V1 may be 0, V2 may be 10, V3 may be 20, and V4 may be 30, but are not limited thereto.

TABLE 1

EpPix Criteria

| EpPix Value | Error @ |
|---|---|
| V1 < EpPix <= V2 | May Occur in R4 |
| V2 < EpPix <= V3 | May Occur in R3 and R4 |
| V3 < EpPix <= V4 | May Occur in R2 to R4 |
| EpPix > V4 | May Occur in R1 to R4 |

Referring to Table 1 and FIGS. 3 and 5, in response to the processor 950 determining an EpPix value that is greater than V1 and less than or equal to V2 in operation S320 of FIG. 3, the processor 950 in operations S330 and S340 of FIG. 3 may predict the actual EUV patterning process on the wafer using a mask from the EUV simulation may have a good process window (e.g., a process that does not form patterning defects) in the first focus region R1 through the fourth focus region R4 on FIG. 5; however, in response to V1<EpPix<=V2, a patterning defect on the wafer, if one occurs, may occur when the EUV patterning process uses a focus and dose condition at or near Focus Region R4.

As shown in FIG. 6, FEM Margin Results 1, 5, 6, and 10 are results of EUV patterns formed on a wafer that correspond to EUV simulation results that have EpPix values greater than V1 and less than or equal to V2. In FIG. 6, V1 may be 0, V2 may be 10, V3 may be 20, and V4 may be 30. As predicted from the EpPix values greater than 0 and less than or equal to 10, no patterning defects were observed in FEM Margin results 1 and 10. In FEM Margin Results 5 and 6, the dark rectangles indicate regions on the FEM Margin Results where patterning defects were observed; the gray rectangles indicate regions of potential patterning issues (e.g., borderline defect area) on the FEM Margin Result. In FEM Margin Results 5 and 6, the two dark rectangles in FEM Margin Result 5 (see row 1, column 4 and row 2, column 2) and the one dark rectangle in FEM Margin Result 6 (see row 1, column 4) indicate patterning defects were observed in outermost focus regions comparable to focus region R4 in FIG. 5. As shown in FIG. 6, in FEM Margin Results 5 and 6, the patterning defects were observed at defocus conditions that are farthest away from the best dose best focus conditions at the center of FEM Margin Results 5 and 6. Also, FEM Margin result 6 has a gray rectangle in row 2 column 6.

Referring to Table 1 and FIGS. 3 and 5, in response to the processor 950 determining an EpPix value that is greater than V2 and less than or equal to V3, in operations S320 to S340 of FIG. 3, the processor 950 may predict the actual EUV patterning process may form patterning defects when the actual EUV patterning process uses a focus and dose condition at or near Focus Regions R3 and R4. Additionally, in response to V2<EpPix<=V3, the processor 950 may predict the actual EUV patterning process does not form a patterning defect on the wafer using focus and dose conditions at or near Focus Regions R1 and R2.

As shown in FIG. 6, FEM Margin Result 9 is an EUV pattern wafer result that corresponds to an EUV simulation result that has an EpPix value greater than 10 and less than or equal to 20, where V2 may be 10 and V3 may be 20. In FEM Margin Result 9, dark rectangles in rows 1-2 and column 4 indicate patterning defects were observed in focus regions comparable to R3 and R4 in FIG. 4. Also, gray rectangles in row 3 columns 3 to 5 of FEM Margin Result 9 indicate potential patterning issues in focus regions comparable to R3 in FIG. 5.

Referring to Table 1 and FIGS. 3 and 5, in response to the processor 950 determining an EpPix that is greater than V3 and less than or equal to V4, in operations S320 to S340 of FIG. 3, the processor 950 may predict the actual EUV patterning process may form patterning defects when the actual EUV patterning process uses a focus and dose condition at or near at least one of Focus Regions R2, R3, and R4. Additionally, in response to V3<EpPix<=V4, the processor 950 may predict the actual EUV patterning process does not form a patterning defect on the wafer result using focus and dose conditions at or near Focus Region R1.

As shown in FIG. 6, FEM Margin Results 3 and 12 are EUV pattern wafer results that correspond to EUV simulation results that have an EpPix value greater than 20 and less than or equal to 30, where V3 may be 20 and V4 may be 30. In FEM Margin Result 3, dark rectangles in rows 1-3, columns 3-5 indicate patterning defects were observed in focus regions comparable to R2, R3, and R4 in FIG. 5. In FEM Margin Result 12, dark rectangles in rows 1-3 and column 4 indicate patterning defects were observed in focus regions comparable to R2, R3, and R4 in FIG. 5.

Referring to Table 1 and FIGS. 3 and 5, in response to the processor 950 determining an EpPix that is greater than V4, in operations S320 to S340 of FIG. 3, the processor 950 may predict the actual EUV patterning process may form patterning defects when the actual EUV patterning process uses a focus and dose condition at or near any one of Focus Regions R1, R2, R3, and R4.

As shown in FIG. 6, FEM Margin Results 2, 4, 7, 8, and 11 are EUV pattern wafer results that correspond to EUV simulation results that have an EpPix value greater than 30, where V4 may be 30. In FEM Margin Results 2, 7, and 8, dark rectangles surround each square on FEM Margin Results 2, 7, 8; thus, patterning defects were observed in focus regions comparable to R1, R2, R3, and R4 in FIG. 5. In FEM Margin Result 4, dark rectangles in rows 1-3 and columns 3-5 indicate patterning defects were observed in in focus regions comparable to R2, R3, and R4 in FIG. 5. In FEM Margin Result 11, dark rectangles in rows 1-2 and column 4 indicate patterning defects were observed in focus regions comparable to R3 and R4 in FIG. 5.

Referring to FIGS. 3, 5, and 6, in operations S330 and S340, the predicted wafer process window generated by the processor 950 using the correlation parameter CP may include at least one of: in response to the EpPix value being greater than the first value V1 and less than or equal to the second value V2, the processor 950 predicting the patterning defect does not occur in the first focus region R1 to the fourth focus region R4 or the patterning defect occurs at the fourth focus region R4; in response to the EpPix value being greater than the second value V2 and less than or equal to the third value V3, the processor 950 predicting the patterning defect occurring in at least one of the third focus region R3 and the fourth focus region R4; in response to the EpPix value being greater than the third value V3 and less than or equal to the fourth value V4, the processor 950 predicting the patterning defect occurring in at least one of the second focus region R2, the third focus region R3, and the fourth focus region R4; and in response to the EpPix value being greater than a fourth value V4, the processor 950 predicting the patterning defect occurs in at least one of the first focus region R1, the second focus region R2, the third focus region R3, and the fourth focus region R4.

Figure 7:
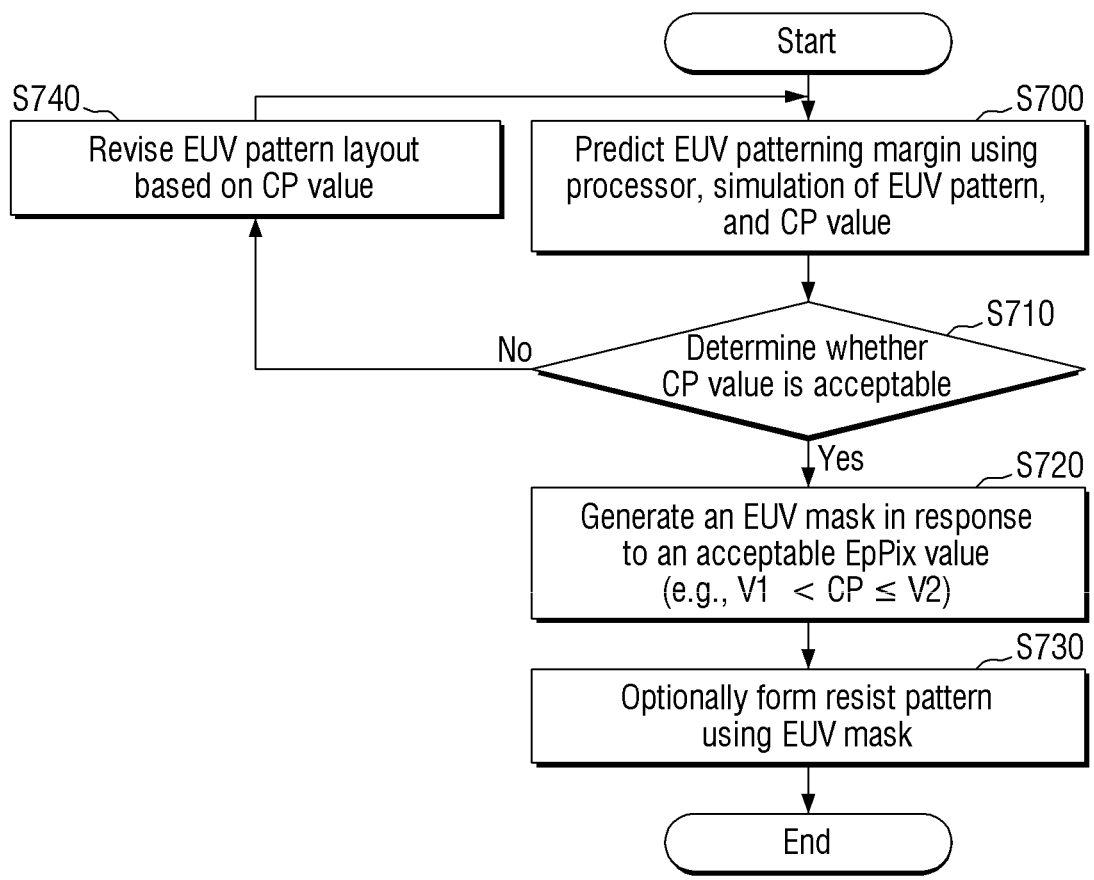
FIG. 7 is a flow chart for preparing an EUV mask structure using a processor according to some example embodiments.

FIG. 7 is a flow chart for preparing an EUV mask structure using a processor according to some example embodiments.

Referring to FIGS. 7 and 9, in operation S700, the processor 950 may predict an EUV patterning margin by generating a predicted wafer process window using a correlation parameter CP and parameters from a simulation result of an EUV pattern layout according to operations S310, S320, and S330 in FIG. 3. Next, in operation S710, the processor 950 may determine whether a value of the correlation parameter CP is acceptable. Operation S710 may be performed the same way as operation S340. In response to a value of the correlation parameter CP that is greater than V2 in operation S710, the processor 950 may proceed to operation S740. The processor 950 may perform operation S740 the same way as operation S350 described above in FIG. 3, except the processor 950 returns to operation S700 after operation S740.

On the other hand, in response to a value of the correlation parameter CP that is greater than the first value V1 and less than or equal to the second value V2 in operation S710, the processor 950 may determine the EUV mask structure is suitable to order based on the simulation result of the EUV pattern layout. In operation S720, the processor 950 may decide to generate an EUV mask structure. A process for generating the EUV mask structure of an EUV mask assembly is described later in FIG. 10. After operation S720, a resist pattern may be formed in operation S730 using the EUV mask structure. A process for generating a resist pattern is described later in FIG. 11.

Figure 8A:
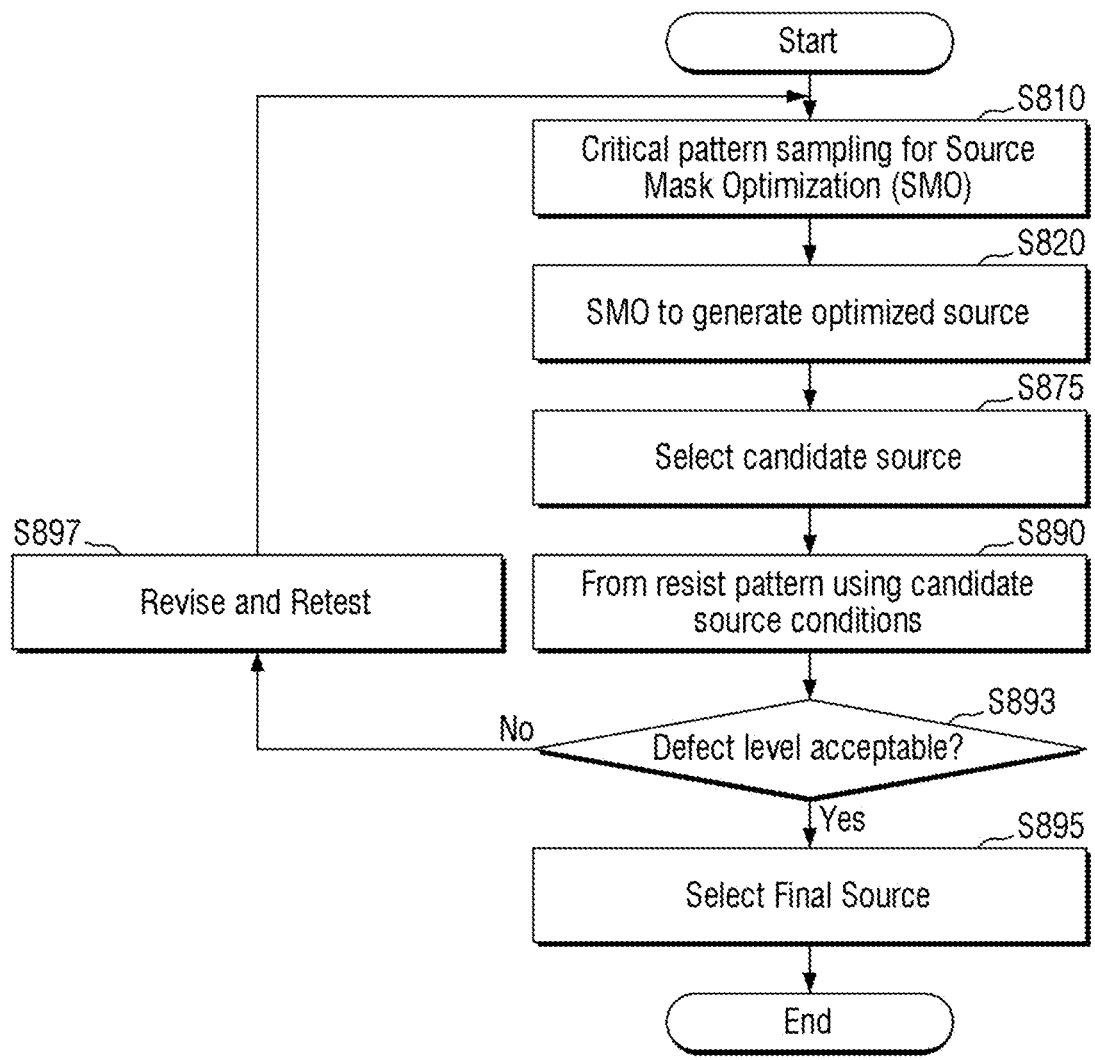
FIGS. 8A, 8B, and 8C are flow charts for a Source Mask Optimization (SMO) using a processor according to some example embodiments.
Figure 8B:
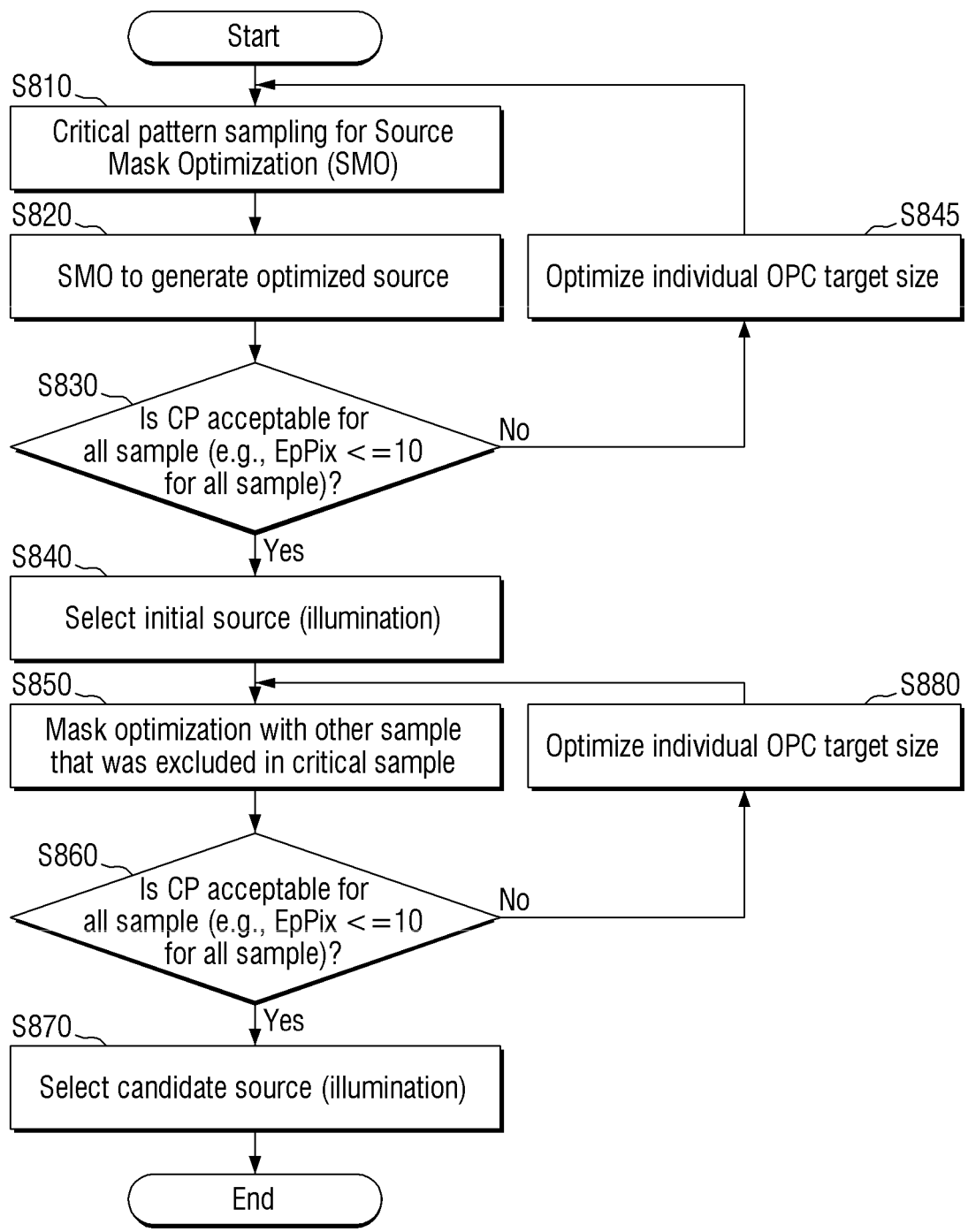
Figure 8C:
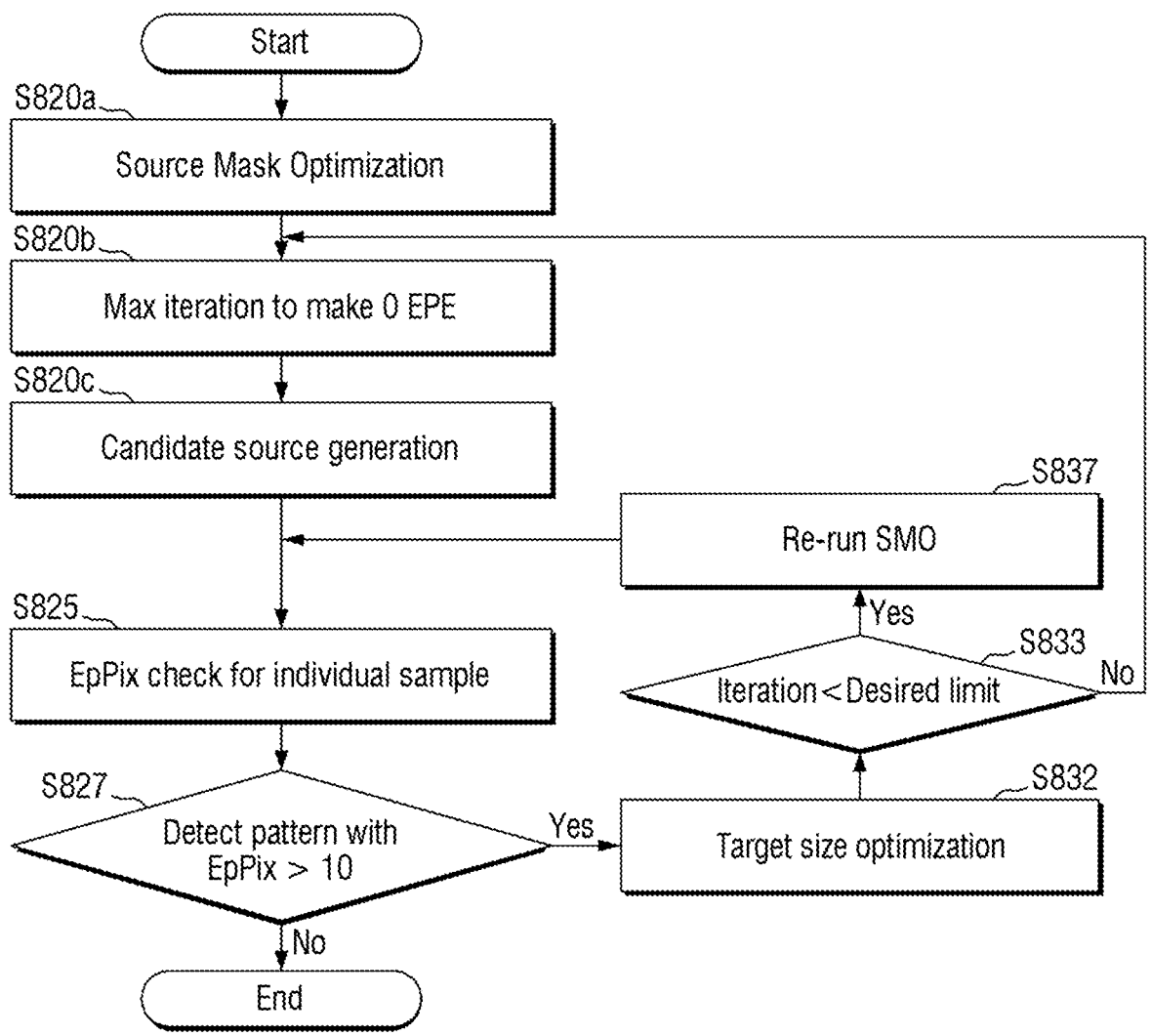

FIGS. 8A, 8B, and 8C are flow charts for a Source Mask Optimization (SMO) using a processor according to some example embodiments.

Referring to FIGS. 8A, 8B, and 9, in operation S810, the processor 950 may perform critical pattern sampling for source mask optimization (SMO). The critical pattern may be a portion of the EUV layout that includes the anchor pattern. The processor 950 may select the anchor pattern based on the most difficult feature to pattern on the wafer. For example, the anchor pattern may be a pattern that has the smallest pitch size compared to all of the patterns to be formed in an EUV layout. In operation S820, the processor 950 may generate an optimized source to provide a simulation result of an EUV pattern layout. Next, the processor 950 may generate a correlation parameter CP (e.g., EpPix value) in operation S830 based on parameters in the optimized source and the processor 950 may determine whether the correlation parameter CP is acceptable in operation S830. The correlation parameter CP may be generated according to the same procedure discussed in operation S320 of FIG. 3. In some example embodiments, the processor 950 may generate the correlation parameter CP by calculating an EpPix value according to Equation 1 above.

In response to an unacceptable value for the correlation parameter CP (e.g., CP>10), the processor 950 may perform operation S845 to optimize the individual optical-proximity-correction (OPC) target size in the critical pattern of the optimized source and then proceed back to operation S810. In response to an acceptable correlation parameter CP for all of the sample (e.g., 0<CP<=10), an initial source illumination for the critical pattern may be selected in operation S840.

In operation S850, the processor 950 may perform mask optimization with another sample that was excluded in the critical sample. Then, in operation S860, the processor 950 may generate a correlation parameter CP (e.g., EpPix value) based on parameters in the optimized source from the other sample. In response to the correlation parameter CP being acceptable for all of the sample (e.g., EpPix<=10), the processor 950 may proceed to operation S870 and select a candidate source illumination. The processor 950 may select the candidate source illumination in operation S870 after making sure the same source illumination achieves an acceptable correlation parameter CP (e.g., EpPix<=10) in operations S830 and S860. Alternatively, in response to the correlation parameter CP being unacceptable (e.g., CP>10) in operation S850, the processor 950 may proceed to operation S880 to optimize the individual OPC in the other sample that was excluded in the critical sample.

Referring to FIGS. 8A and 8B, operation S870 in FIG. 8B is a candidate source generated by a patent algorithm and operation S875 in FIG. 8A is a source generated by a cost function using the apparatus 900. Operations S870 and S875 may have different source shapes. In some example embodiments, the cost function of the apparatus 900 in relation to operation S875 in FIG. 8A may be a SEPE parameter (e.g., SEPE band with and/or SEPE band space, discussed in FIG. 1) for making the EpPix value less than or equal to a desired value (e.g., 10) for all samples (see operations S830 and S860 in FIG. 8B). The patent algorithm may be an iterative process to reduce the EpPix value.

Referring to FIGS. 8A and 8B, after processor 950 selects the candidate source generated by a patent algorithm in operation S870, a candidate source generated by a cost function is selected (operation S875) and a mask structure may be ordered. Then, in operation S890, a resist pattern may be formed on the wafer using the candidate source conditions for the EUV process and the mask structure ordered. In operation S890, the resist pattern may be evaluated on the wafer to check for defects in operation S893. If the level of defects is less than or equal to an acceptable threshold level, then the candidate source in operation S875 may be selected as the final source in operation S895. If the level of defects exceeds an acceptable threshold level, then the source and/or EUV mask layout may be revised and re-tested in operation S897 and operations S810 through S890 of FIGS. 8A and 8B may be repeated afterwards.

Because there may be a waiting time between the selection of the candidate source in operation S875, the ordering the mask structure afterwards, and the wafer evaluation in operation S890, a method for determining whether to order a mask structure using a processor according to some example embodiments may be performed before ordering a mask structure to reduce the likelihood of ordering a mask structure that is not suitable for an actual EUV patterning process. As discussed above, before ordering the mask structure, the processor 950 may determine a correlation parameter CP (e.g., EpPix) for features in a critical pattern of an EUV layout and other patterns, based on an EUV simulation result and empirical models, to predict whether the mask structure to be ordered will be suitable for an actual EUV patterning process. Thus, according to example embodiments, the time and expense of ordering masks that are not suitable for an actual EUV patterning process may be limited and/or prevented.

FIG. 8C is a flow chart for explaining an example of a patent algorithm according to some example embodiments. In some example embodiments, in response to executing instructions stored in the memory 930, the processor 950 of the apparatus 900 in FIG. 9 may be configured to perform the patent algorithm example discussed below with reference to FIG. 8C of the present application.

Referring to FIGS. 8C and 9, in operation S820a, the processor 950 may perform source mask optimization (SMO). In operation S820b, the processor 950 may repeat the SMO of operation S820a through several iterations up to a desired limit (e.g., a threshold limit) in order to generate an optimized source mask that minimizes edge placement error (EPE). For example, in operation S820b, SMO of operation S820a may be repeated to make a source that has 0 EPE and/or a minimal level of EPE. Then, in operation S820c, the processor 950 may generate the candidate source. Then, in operation S825, the processor 950 may check the EpPix value for an individual sample. In operation S827, in response to the EpPix value of the individual sample being less than or equal to 10 (or a different desired level), processor 950 may end the patent algorithm process. Alternatively, in operation S827, in response to the EpPix value being greater than 10, the processor 950 may proceed to operation S832. In operation S832, the processor 950 may optimize the target size (e.g., adjust a dimension of a target) through an iterative process. In operations S833 and S837, the processor 950 may re-run the SMO in response to the number of iterations for target size optimization being less than or equal a desired limit (e.g., 100). Alternatively, in operation S833, in response to the number of iterations for target size optimization being greater than a desired limit (e.g., 100), the processor 950 may return to the iterative process for reducing edge-placement error in operation S820b.

Referring to FIG. 9, in some example embodiments, in response to executing the instructions stored in the memory 930, the processor 950 may be configured to determine a correlation parameter (CP), based on a weighting value w, a simulated DOF, a simulated EL, a simulated LER area parameter, and a simulated LER width parameter that are based on a simulation result of an EUV patterning layout. Also, in response to executing the instructions stored in the memory 930, the processor 950 may generate a predicted wafer process window (e.g., generated a FEM) based on the correlation parameter CP, and the processor may be configured to determine whether to order the mask structure based on the CP and the predicted wafer process window.

In some example embodiments, in response to executing the instructions stored in the memory 930, the processor 950 may be configured to determine the correlation parameter CP as the EpPix value according to Equation 1 described above.

Figure 10:
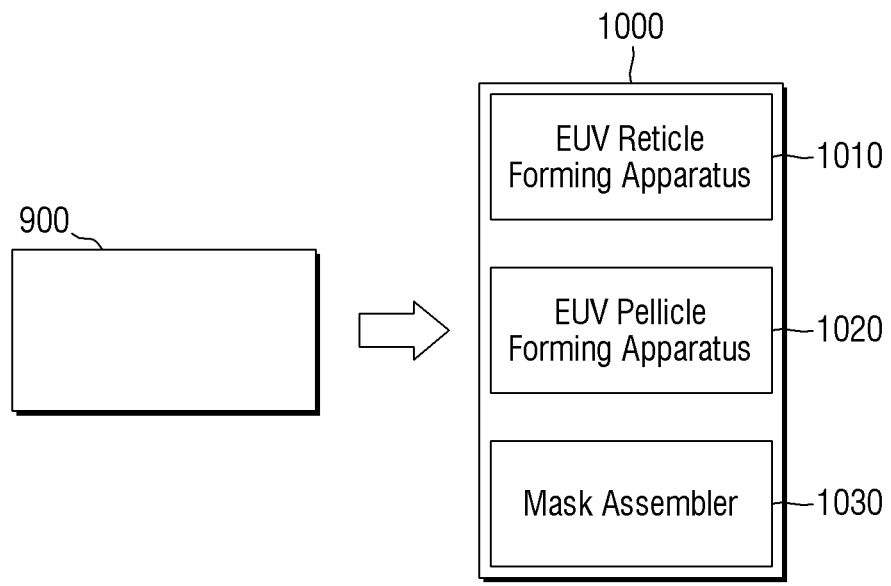
FIG. 10 is diagram of a system including the apparatus in FIG. 9 and an apparatus for forming a mask structure according to some example embodiments.

FIG. 10 is diagram of a system including the apparatus in FIG. 9 and an apparatus for forming a mask structure according to some example embodiments.

Referring to FIG. 10, in some example embodiments, a system may include the apparatus 900 in FIG. 9 coupled to an EUV mask assembly apparatus 1000. The EUV mask assembly apparatus 1000 may include at least one of an EUV Reticle Forming Apparatus 1010, an EUV Pellicle Forming Apparatus, and a Mask Assembler 1030. In response to the processor 950 of the apparatus 900 generating a suitable correlation parameter CP (e.g., V1<CP<=V2) based on a simulation result of an EUV pattern layout, the processor 950 may order an EUV mask structure. The processor 950 may control the apparatus 900 to direct the EUV mask assembly apparatus 1000 to form a reticle based on the simulation result of the EUV pattern layer, form a pellicle, and attach the pellicle to the reticle to form an EUV mask assembly. The EUV Reticle Forming Apparatus 1010 may include deposition equipment and patterning equipment for forming an EUV reticle structure on a suitable substrate. The EUV Pellicle Forming Apparatus 1020 include deposition equipment for forming a suitable pellicle. The Mask Assembler 1030 may form an EUV mask assembly by joining the pellicle to the EUV reticle with a pellicle frame. An example of an EUV mask assembly is illustrated in FIG. 11.

Figure 11:
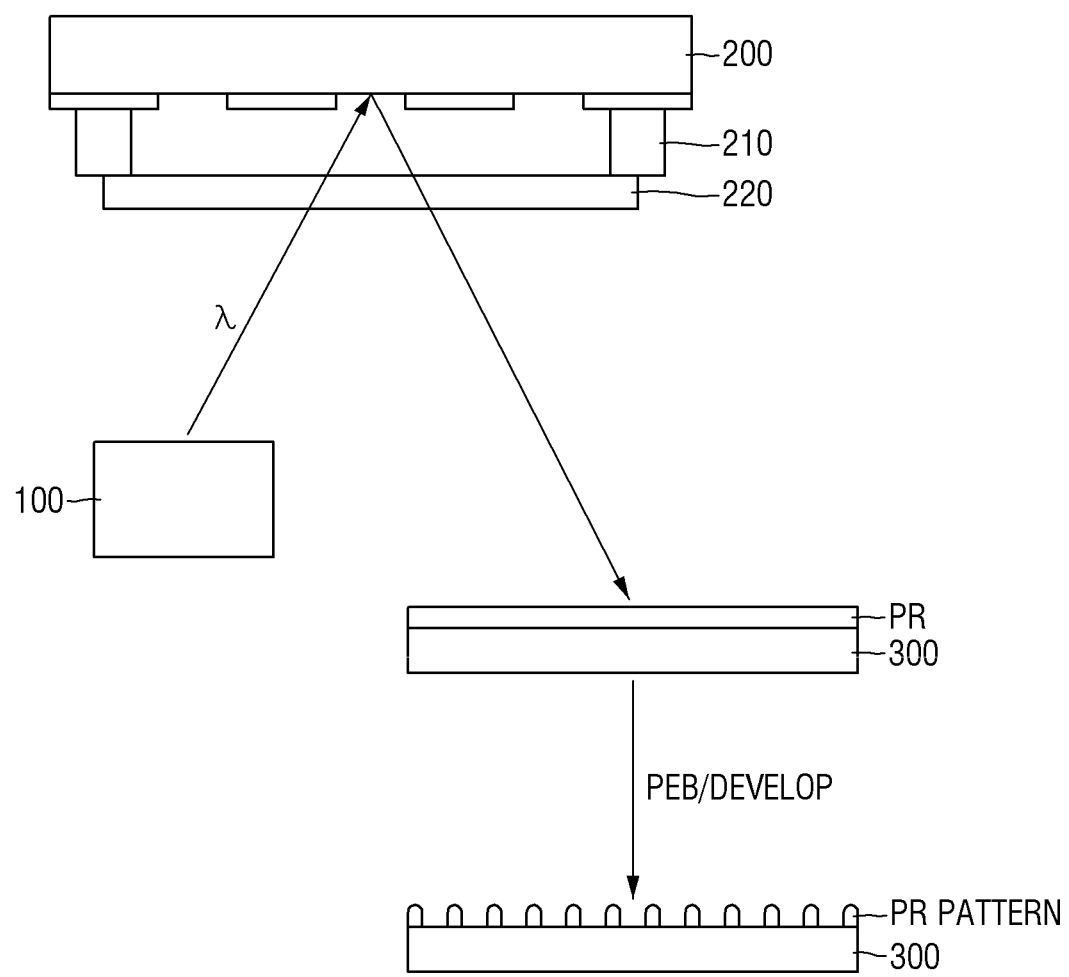
FIG. 11 is a diagram illustrating an EUV patterning process according to some example embodiments.

FIG. 11 is a diagram illustrating an EUV patterning process according to some example embodiments.

Referring to FIG. 1, an EUV patterning process according to some example embodiments may include irradiating a mask assembly with EUV light A generated by an EUV light source 100. The EUV light source 100 may generate EUV light A having a wavelength of about 13.5 nm using a carbon plasma, but example embodiments are not limited thereto and other laser structures may be used instead. The mask assembly may include several mask structures: a reticle 200, a pellicle 220, and a frame 210 connecting the pellicle 220 to the reticle 200. The pellicle 220 may include a carbon layer. The mask assembly may be formed using the EUV mask assembly apparatus 1000 according to some example embodiments.

The reticle 200 may reflect the EUV light A toward a photoresist layer PR formed on a wafer 300. The reticle 200 may include a pattern and the pattern of the reticle may expose the photoresist layer PR on the wafer 300 in locations corresponding to the pattern of the reticle 200. After the photoresist layer PR is exposed, a post-exposure bake and developing process PEB/DEVELOP may be formed to form a photoresist pattern PR PATTERN on the wafer 300.

It should be understood that example embodiments described herein should be considered in a descriptive sense only and not for purposes of limitation. While some example embodiments have been particularly shown and described, it will be understood by one of ordinary skill in the art that variations in form and detail may be made therein without departing from the spirit and scope of the claims.

What is claimed is:

1. A method for determining whether to order a mask structure using a processor, the method comprising:

acquiring a simulation result of an extreme ultraviolet (EUV) pattern layout, the simulation result including a simulated depth of focus (DOF), a simulated energy latitude (EL), a simulated line-edge roughness (LER) area parameter that is less than or equal to a first threshold, and a simulated LER width parameter that is less than or equal to a second threshold, the simulated LER area parameter indicating a roughness of one or more area features in the simulation result of the EUV pattern layout, the simulated LER width parameter indicating a roughness of one or more line features in the simulation result of the EUV pattern layout;

determining a correlation parameter (CP) using the processor based on the simulated DOF, the simulated EL, the simulated LER area parameter, the simulated LER width parameter, and a weighting value for the simulation result, the CP indicating a correlation between the simulation result of the EUV pattern layout and an actual wafer result of the EUV pattern layout;

generating a predicted wafer process window using the processor based on the CP, the predicted wafer process window indicating whether the actual wafer result of the EUV pattern layout will include a patterning defect; and determining the mask structure is suitable for ordering based on the CP and the predicted wafer process window.

2. The method of claim 1, wherein the simulated LER area parameter is a stochastic edge placement error (SEPE) band space that is less than or equal than the first threshold, the simulated LER width parameter is a SEPE band width that is less than or equal to the second threshold.

3. The method of claim 2, wherein the determining the CP includes calculating an EpPix value according to Equation 1 below:

$$EpPix=\{(1+w_i^a+w_{ii}^b)-(e,f)\}\times(1+w_{iii}^c+w_{iv}^d)\} \quad \text{[Equation 1]}$$

wherein, in Equation 1, a is a focus center of the simulated DOF, b is a dose center of the simulated EL, c is the SEPE band space, d is the SEPE band width, $w_i$, $w_{ii}$, $w_{iii}$, and $w_{iv}$ are components of the weighting value, and (e,f) is an exposure-focus compensation factor.

4. The method of claim 3, wherein the generating the predicted wafer process window includes generating a prediction of a focus exposure metric (FEM) using the processor based on the EpPix value.

5. The method of claim 4, wherein the generating the prediction of the FEM includes generating a predicted FEM margin map.

6. The method of claim 5, wherein the generating the prediction of the FEM includes generating the predicted FEM margin map to include a first focus region, a second focus region surrounding the first focus region, a third focus region surrounding the second focus region, and a fourth focus region surrounding the third focus region, the generating the predicted wafer process window includes at least one of, in response to the EpPix value being greater than a first value and less than or equal to a second value, predicting the patterning defect not occur in the first focus region to the fourth focus region or the patterning defect occurs at the fourth focus region, in response to the EpPix value being greater than the second value and less than or equal to a third value, predicting the patterning defect occurring in at least one of the third focus region and the fourth focus region, in response to the EpPix value being greater than the third value and less than or equal to a fourth value, predicting the patterning defect occurring in at least one of the second focus region, the third focus region, and the fourth focus region, and in response to the EpPix value being greater than a fourth value, predicting the patterning defect occurs in at least one of the first focus region, the second focus region, the third focus region, and the fourth focus region.

7. The method of claim 6, wherein the first value is 0, the second value 10, the third value 20, and the fourth value is 30.

8. The method of claim 3, wherein the exposure-focus compensation factor (e,f) is based on an empirical model.

9. The method of claim 8, wherein the exposure-focus compensation factor (e,f) is in a range of about 1 to about 10.

10. The method of claim 1, wherein the acquiring the simulation result of the EUV pattern layout includes generating the simulation result based on a pre-optical-proximity-correction layout (pre-OPC layout) and calibrated models.

11. The method of claim 1, wherein the weighting value w is based on an empirical model.

12. The method of claim 11, wherein the weighting value w is in a range of about 1 to about 10.

13. The method of claim 1, wherein the simulation result of the EUV pattern layout includes a simulated anchor pattern and a simulated semi-isolated pattern.

14. The method of claim 1, further comprising:

forming a revised EUV pattern layout by adjusting a feature in the EUV pattern layout in response to a value of the of the CP being greater than a desired value;

acquiring a revised simulation result of the revised EUV pattern layout, the revised simulation result including a revised simulated DOF, a revised simulated EL, a revised simulated LER area parameter that is less than or equal to the first threshold, a revised simulated LER width parameter that is less than or equal to the second threshold, and a revised weighting value;

determining a revised CP using the processor based on the revised simulated DOF, the revised simulated EL, the revised simulated LER area parameter, the revised simulated LER width parameter, and the revised weighting value, the revised CP indicating a correlation between the revised simulation result of the revised EUV pattern layout and an actual wafer result of the revised EUV pattern layout;

generating a revised predicted wafer process window based on the revised CP, the revised predicted wafer process window indicating whether the actual wafer result of the revised EUV pattern layout will include the patterning defect; and determining the mask structure is suitable for ordering based on the revised CP and the revised predicted wafer process window.

15. The method of claim 14, wherein the revised simulated LER area parameter is a revised stochastic edge placement error (SEPE) band space that is less than or equal than the first threshold, the revised simulated LER width parameter is a revised SEPE band width that is less than or equal to the second threshold, the determining the revised CP includes calculating an EpPix value according to Equation 1 below:

$$EpPix=\{(1+w_i^a+w_{ii}^b)-(e,f)\}\times(1+w_{iii}^c+w_{iv}^d)\} \quad \text{[Equation 1]}$$

wherein, in Equation 1, a is a focus center of the revised simulated DOF, b is a dose center of the revised simulated EL, c is the revised SEPE band space, d is the revised SEPE band width, $w_i$, $w_{ii}$, $w_{iii}$, and $w_{iv}$ are components of the revised weighting value, and (e,f) is a revised exposure-focus compensation factor.

16. A method for manufacturing an EUV mask, the method comprising:

performing the method of claim 1; and ordering the mask structure in response to a value of the CP being less than a desired value.

17. A non-transitory computer-readable medium storing computer-executable instructions that, when executed by a processor, cause the processor to perform operations for determining whether to order a mask structure using an electronic apparatus, the operations including:

acquiring a simulation result of an extreme ultraviolet (EUV) pattern layout using the electronic apparatus, the simulation result including a simulated depth of focus (DOF), a simulated energy latitude (EL), a simulated line-edge roughness (LER) area parameter that is less than or equal to a first threshold, and a simulated LER width parameter that is less than or equal to a second threshold;

determining a correlation parameter (CP) using the electronic apparatus based on the simulated DOF, the simulated EL, the simulated LER area parameter, the simulated LER width parameter, and a weighting value for the simulation result, the CP indicating a correlation between the simulation result of the EUV pattern layout and an actual wafer result of the EUV pattern layout;

generating a predicted wafer process window using the electronic apparatus based on the CP, the predicted wafer process window indicating whether the actual wafer result of the EUV pattern layout will include a patterning defect; and determining the mask structure is suitable for ordering based on the CP and the predicted wafer process window.

18. An apparatus for determining whether to order a mask structure, the apparatus comprising:

a memory; and a processor coupled to the memory, the processor, in response to executing instructions received from the memory, being configured to determine a correlation parameter (CP), based on a simulated depth of focus (DOF), a simulated energy latitude (EL), a simulated line-edge roughness (LER) area parameter, a simulated LER width parameter, and a weighting value, the simulated DOF, the simulated EL, the simulated LER area parameter, the simulated LER width parameter being based on a simulation result of an extreme ultraviolet (EUV) pattern layout, the CP indicating a correlation between the simulation result of the EUV pattern layout and an actual wafer result of the EUV pattern layout, the processor being configured to generate a predicted wafer process window based on the CP, the predicted wafer process window indicating whether the actual wafer result of the EUV pattern layout will include a patterning defect, and the processor being configured to determine the mask structure is suitable for ordering based on the CP and the predicted wafer process window.

19. The apparatus of claim 18, wherein the simulated LER area parameter is a stochastic edge placement error (SEPE) band space that is less than or equal than a first threshold, the simulated LER width parameter is a SEPE band width that is less than or equal to a second threshold, and the processor is configured to determine the CP by calculating an EpPix value according to Equation 1 below:

$$\text{EpPix} = \{(1+w_i^a+w_{ii}^b) - (e,f)\} \times (1+w_{iii}^c+w_{iv}^d)\} \qquad \text{[Equation 1]}$$

wherein, in Equation 1, a is a focus center of the simulated DOF, b is a dose center of the simulated DOF, c is the SEPE band space, d is the SEPE band width, $w_i$, $w_{ii}$, $w_{iii}$, and $w_{iv}$ are components of the weighting value, and (e,f) is an exposure-focus compensation factor.

20. The apparatus of claim 19, wherein the processor is configured generate a predicted wafer process window as a focus exposure metric (FEM) based on the EpPix value.

* * * * *